United States Patent
Muñoz De La Torre Alonso et al.

(10) Patent No.: US 12,483,866 B2
(45) Date of Patent: Nov. 25, 2025

(54) OPTIMIZED PROCEDURE FOR PFD MANAGEMENT

(71) Applicant: Telefonaktiebolaget LM Ericsson (publ), Stockholm (SE)

(72) Inventors: Miguel Angel Muñoz De La Torre Alonso, Madrid (ES); Antonio Cañete Martinez, Madrid (ES); Tianmei Liang, Shanghai (CN); Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 18/009,148

(22) PCT Filed: May 27, 2021

(86) PCT No.: PCT/EP2021/064150
§ 371 (c)(1),
(2) Date: Dec. 8, 2022

(87) PCT Pub. No.: WO2021/249779
PCT Pub. Date: Dec. 16, 2021

(65) Prior Publication Data
US 2023/0224681 A1 Jul. 13, 2023

(30) Foreign Application Priority Data
Jun. 11, 2020 (WO) ................ PCT/CN2020/095607

(51) Int. Cl.
*H04W 4/24* (2024.01)
*H04L 12/14* (2006.01)
*H04W 8/18* (2009.01)

(52) U.S. Cl.
CPC ........... *H04W 4/24* (2013.01); *H04L 12/1407* (2013.01); *H04W 8/18* (2013.01)

(58) Field of Classification Search
CPC ...... H04W 4/24; H04W 8/18; H04L 12/1407; H04L 12/1403; H04M 15/66
(Continued)

(56) References Cited

U.S. PATENT DOCUMENTS

| | | |
|---|---|---|
| 2009/0222654 A1 | 9/2009 | Kumar et al. |
| 2014/0181501 A1 | 6/2014 | Hicok et al. |

(Continued)

FOREIGN PATENT DOCUMENTS

| | | |
|---|---|---|
| CN | 109951824 A | 6/2019 |
| EP | 3627865 A1 | 3/2020 |

(Continued)

OTHER PUBLICATIONS

3GPP, "3GPP TS 29.122 V16.6.0", 3rd Generation Partnership Project; Technical Specification Group Core Network and Terminals; T8 reference point for Northbound APIs; (Release 16), Jun. 2020, 1-360.

(Continued)

*Primary Examiner* — Huy C Ho
(74) *Attorney, Agent, or Firm* — Murphy, Bilak & Homiller, PLLC

(57) ABSTRACT

The embodiments herein relate to optimized procedure for Packet Flow Description (PFD) management. In one embodiment, there proposes a method (800) for managing Packet Flow Description (PFD), comprising: receiving (S801) from a Session Management Function (SFM) (201) or a User Plane Function (UPF) (302) a demand message indicating the demand for at least one PFD rule for an application; detecting (S802) the at least one PFD rule for the application; and notifying (S803) information regarding the at least one PFD rule to the SMF (201) or the UPF (302). The embodiments herein may achieve an optimized procedure for PFD Management which optimizes the delivery of (Continued)

PFD rules, by reducing the amount of signaling and by reducing the number of hops between the producer (AF) and the consumer (UPF).

16 Claims, 15 Drawing Sheets

(58) Field of Classification Search
USPC .......................................................... 370/229
See application file for complete search history.

(56) References Cited

U.S. PATENT DOCUMENTS

| | | | |
|---|---|---|---|
| 2018/0255036 A1* | 9/2018 | Fiedler | H04L 43/106 |
| 2020/0145876 A1 | 5/2020 | Dao et al. | |
| 2020/0336321 A1* | 10/2020 | Ding | H04L 41/0894 |

FOREIGN PATENT DOCUMENTS

| | | |
|---|---|---|
| WO | 2019158224 A1 | 8/2019 |
| WO | 2019184680 A1 | 10/2019 |
| WO | 2019234481 A1 | 12/2019 |

OTHER PUBLICATIONS

3GPP, "3GPP TS 29.551 V16.3.0", 3rd Generation Partnership Project; Technical Specification Group Core Network and Terminals; 5G System; Packet Flow Description Management Service; Stage 3 (Release 16), Mar. 2020, 1-30.

Huawei, "Service description for Nnef_EventExposure service", TSG-CT WG3 Meeting #106, C3-194396, (Revision of C3-194260), Portoroz, Slovenia, Oct. 7-11, 2019, 1-5.

* cited by examiner

OPTIMIZED PROCEDURE FOR PFD MANAGEMENT

TECHNICAL FIELD

The embodiments herein relate generally to the field of wireless communication, and more particularly, the embodiments herein relate to optimized procedure for PFD management.

BACKGROUND

FIG. 1 is a schematic block diagram showing the 5G reference architecture as defined by 3GPP. As shown in FIG. 1, the 5G reference architecture may include the following network nodes:
  AF (Application Function);
  NEF (Network Exposure Function);
  SMF (Session Management Function);
  UPF (User Plane Function).
AF (Application Function)
  The Application Function (AF) interacts with the 3GPP Core Network in order to provide services, and specifically in the context of this disclosure, to provision PFD rules that will allow network operator to classify application's traffic.
NEF (Network Exposure Function)
  The Network Exposure Function (NEF) supports different functionality and specifically in the context of this disclosure, NEF supports the PFD Management service, which allows NEF to receive PFD rules from AF, store them in UDR and providing them to SMF.
SMF (Session Management Function)
  The Session Management function (SMF) supports different functionality, and specifically in the context of this disclosure, SMF is able to fetch from the NEF (PFD management service) the PFD rules for the applications. SMF can also subscribe to the NEF on notifications about PFD data of the different applications, either to a specific list or to all of them. SMF also supports PFCP PFD Management procedure in order to provision PFD rules to UPF.
UPF (User Plane Function)
  The User Plane function (UPF) supports different functionality, and specifically in the context of this disclosure, UPF supports handling of user plane traffic, including packet inspection, where the rules to detect the application's traffic are either locally provisioned in UPF or received from SMF through the PFCP PFD Management procedure.
PFD Management
  As part of 3GPP Rel14, a mechanism has been standardized to exchange user traffic classification rules (in the form of PFDs) between Content Provider/s and Operator Network/s. 3GPP TS 29.122 defines the T8 interface between the SCS/AS (Content Provider) and the Service Capability Exposure Function (SCEF) in Operator Network's Packet Core, and specifically the T8 API for PFD Management in Section "4.4.10 Procedures for PFD Management". Additionally, a new entity called PFDF has been standardized for this.
  The PFDs are provisioned from the Content Provider (SCS/AS) to the Operator Network Packet Core through the SCEF and stored in the PFDF. The PFDs describe different types of traffic used by the Content Provider applications and are exchanged with the network e.g. to implement zero rating or QoS Use Cases (i.e. identify the Content Provider's traffic and do not deduct from user's quota or apply better QoS than default traffic).
  Examples of PFDs include a destination IPv4 or IPv6 address (all the traffic to those addresses is matched by the PFD) or an HTTP URL.
  In 3GPP Rel15, as part of 5G network architecture, the above mechanism has been ported as shown in FIG. 2, which is a schematic block diagram showing the 5G Core (5GC) PFD management, and with the following modifications:
  AF (instead of SCS/AS)
  NEF (instead of SCEF)
  PFD Management service in NEF (instead of PFDF entity)
  UPF (instead of TDF-U or PGW-U)
  Storage of PFDs in UDR (instead of storing them at PFDF entity).

REFERENCES

3GPP TS 29.551 V16.3.0 (March 2020) 5G System; Packet Flow Description Management Service; Stage 3.

SUMMARY

The following problems are identified in the existing 5GC PFD management:
  The PFD rules for most applications (e.g. Facebook) have a huge size (e.g. usually including thousands of Server IP addresses).
  The existing mechanism to convey the PFD rules from the Content Provider to the Network Operator is not efficient both in terms of signaling and in terms of the number of hops between the producer (AF) and the consumer (UPF).
  In view of above problems in the existing 5GC PFD management, the embodiments herein propose a mechanism which solves the above problems as follows:
  Add support for UPF as consumer for the NEF PFD Management service (through Nnef Southbound API for PFD Management). Currently SMF is the only consumer.
  Optimized Nnef Southbound API for PFD Management, consisting of:
    Optimized Push procedure: by proposing a notification push, where UPF subscribes to NEF on PFD notification for a list of appIds. And NEF notifies UPF accordingly but not passing the PFDs (thus leaving UPF to decide to retrieve them or not).
    Optimized Pull procedure: by proposing UPF to request NEF for PFD rules for a list of appIds and indicating in the request interest either in partial updates (according to a baseline) or full updates. In the case of partial updates, UPF indicating the baseline so NEF is able return a partial update with respect to that baseline.
    Optimized Combined Push-Pull procedure: by proposing UPF to subscribe to NEF on PFD notification for a list of appIds, and, when needed (e.g. during the O&M maintenance window or at PDU session establishment with a PCC rule with a certain appId), UPF pulling the partial PFDs.
  In one embodiment, there proposes a method for managing Packet Flow Description (PFD), comprising: receiving from a user plane node a demand message indicating the demand for at least one PFD rule for an application; detecting the at least one PFD rule for the application; and notifying information regarding the at least one PFD rule to the user plane node.

In one embodiment, the method further comprising: receiving one or more PFD rules for one or more applications from a content providing node; associating a baseline with one or more PFD rules for the application.

In one embodiment, the method further comprising: requesting a PFD storage node to store the one or more PFD rules for the application and the associated baseline.

In one embodiment, the demand message indicates a subscription of the PFD management service, the demand message including a baseline or no baseline; the demand message further including push notification demand.

In one embodiment, the detecting the at least one PFD rule further comprising: detecting the changed PFD rule based on the baseline associated with the one or more PFD rules received from the content providing node and the baseline received in the demand message from the user plane node.

In one embodiment, the demand message indicating a request of the PFD management service, the demand message including a baseline or no baseline.

In one embodiment, the detecting the at least one PFD rule further comprising: querying the PFD storage node for the at least one PFD rule based on the baseline received in the demand message from the user plane node; receiving the changed PFD rule from the PFD storage node.

In one embodiment, the notifying information regarding the at least one PFD rule to the user plane node further comprising: notifying the changed PFD rule and the latest baseline.

In one embodiment, the notifying information regarding the at least one PFD rule to the user plane node further comprising: transmitting the changed PFD rule along with the notifying; or notifying the existence of the changed PFD rule.

In one embodiment, the above methods are performed at a Network Exposure Function (NEF) or a Service Capability Exposure Function (SCEF); wherein the user plane node is a User Plane Function (UPF), a Traffic Detection Function User plane function (TDF-U) or a PDN Gateway User plane function (PGW-U); wherein the PFD storage node is a Unified Data Repository (UDR) or a Packet Flow Description Function (PFDF) entity; wherein the content providing node is an Application Function (AF) or a Service Capability Server (SCS)/Application Server (AS); and wherein the baseline is a version reference or a time stamp.

In another embodiment, there proposes a method for managing Packet Flow Description (PFD), comprising: transmitting a demand message indicating the demand for at least one PFD rule for an application to a network exposure node; receiving information regarding the at least one PFD rule from the network exposure node.

In one embodiment, the demand message indicates a subscription of the PFD management service, the demand message including a baseline or no baseline; the demand message further including push notification demand.

In one embodiment, the demand message indicating a request of the PFD management service, the demand message including a baseline or no baseline.

In one embodiment, the receiving information regarding the at least one PFD rule from the network exposure node further comprising: receiving the latest baseline and the changed PFD rule relative to the PFD rule associated with the baseline in the demand message.

In one embodiment, the receiving information regarding the at least one PFD rule from the network exposure node further comprising: receiving the changed PFD rule; or receiving a notification regarding the existence of the changed PFD rule.

In one embodiment, the method further comprising: retrieving the notified PFD rule during an Operation and Maintenance (O&M) maintenance window or at Packet Data Unit (PDU) session establishment.

In one embodiment, the methods are performed at a User Plane Function (UPF), a Traffic Detection Function User plane function (TDF-U) or a PDN Gateway User plane function (PGW-U); wherein the network exposure node is a Network Exposure Function (NEF) or a Service Capability Exposure Function (SCEF); and wherein the baseline is a version reference or a time stamp.

In yet another embodiment, there proposes a method for managing Packet Flow Description (PFD), comprising: receiving a store request to store at least one PFD rule for an application and an associated baseline; storing the at least one PFD rule and the associated baseline.

In one embodiment, the method further comprising: receiving a query request with an associated baseline; comparing the baseline associated with the query request and the stored baseline; and providing the changed PFD rule based on the comparing and the stored baseline.

In one embodiment, the above methods are performed at a Unified Data Repository (UDR) or a Packet Flow Description Function (PFDF) entity; and wherein the baseline is a version reference or a time stamp.

In yet another embodiment, there proposes an apparatus for managing Packet Flow Description (PFD), comprising: at least one processor; and a non-transitory computer readable medium coupled to the at least one processor, the non-transitory computer readable medium contains instructions executable by the at least one processor, whereby the at least one processor is configured to: receive from a user plane node a demand message indicating the demand for at least one PFD rule for an application; detect the at least one PFD rule for the application; and notify information regarding the at least one PFD rule to the user plane node.

In one embodiment, the at least one processor is further configured to: receive one or more PFD rules for one or more applications from a content providing node; associate a baseline with one or more PFD rules for the application.

In one embodiment, the at least one processor is further configured to: request a PFD storage node to store the one or more PFD rules for the application and the associated baseline.

In one embodiment, the demand message indicates a subscription of the PFD management service, the demand message including a baseline or no baseline; the demand message further including push notification demand.

In one embodiment, when detecting the at least one PFD rule, the at least one processor is further configured to: detect the changed PFD rule based on the baseline associated with the one or more PFD rules received from the content providing node and the baseline received in the demand message from the user plane node.

In one embodiment, the demand message indicating a request of the PFD management service, the demand message including a baseline or no baseline.

In one embodiment, when detecting the at least one PFD rule, the at least one processor is further configured to: query the PFD storage node for the at least one PFD rule based on the baseline received in the demand message from the user plane node; receive the changed PFD rule from the PFD storage node.

In one embodiment, when notifying information regarding the at least one PFD rule to the user plane node, the at least one processor is further configured to: notify the changed PFD rule and the latest baseline.

In one embodiment, when notifying information regarding the at least one PFD rule to the user plane node, the at least one processor is further configured to: transmit the changed PFD rule along with the notifying; or notify the existence of the changed PFD rule.

In one embodiment, the above apparatuses are implemented in a Network Exposure Function (NEF) or a Service Capability Exposure Function (SCEF); wherein the user plane node is a User Plane Function (UPF), a Traffic Detection Function User plane function (TDF-U) or a PDN Gateway User plane function (PGW-U); wherein the PFD storage node is a Unified Data Repository (UDR) or a Packet Flow Description Function (PFDF) entity; wherein the content providing node is an Application Function (AF) or a Service Capability Server (SCS)/Application Server (AS); and wherein the baseline is a version reference or a time stamp.

In yet another embodiment, there proposes an apparatus for managing Packet Flow Description (PFD), comprising: at least one processor; and a non-transitory computer readable medium coupled to the at least one processor, the non-transitory computer readable medium contains instructions executable by the at least one processor, whereby the at least one processor is configured to: transmit a demand message indicating the demand for at least one PFD rule for an application to a network exposure node; receive information regarding the at least one PFD rule from the network exposure node.

In one embodiment, the demand message indicates a subscription of the PFD management service, the demand message including a baseline or no baseline; the demand message further including push notification demand.

In one embodiment, the demand message indicating a request of the PFD management service, the demand message including a baseline or no baseline.

In one embodiment, when receiving information regarding the at least one PFD rule from the network exposure node, the at least one processor is further configured to: receive the latest baseline and the changed PFD rule relative to the PFD rule associated with the baseline in the demand message.

In one embodiment, when receiving information regarding the at least one PFD rule from the network exposure node, the at least one processor is further configured to: receive the changed PFD rule; or receive a notification regarding the existence of the changed PFD rule.

In one embodiment, the at least one processor is further configured to: retrieve the notified PFD rule during an Operation and Maintenance (O&M) maintenance window or at Packet Data Unit (PDU) session establishment.

In one embodiment, the above apparatuses are implemented in a User Plane Function (UPF) or a PDN Gateway User plane function (PGW-U); wherein the network exposure node is a Network Exposure Function (NEF) or a Service Capability Exposure Function (SCEF); and wherein the baseline is a version reference or a time stamp.

In yet another embodiment, there proposes an apparatus for managing Packet Flow Description (PFD), comprising: at least one processor; and a non-transitory computer readable medium coupled to the at least one processor, the non-transitory computer readable medium contains instructions executable by the at least one processor, whereby the at least one processor is configured to: receive a store request to store at least one PFD rule for an application and an associated baseline; store the at least one PFD rule and the associated baseline.

In one embodiment, the at least one processor is further configured to: receive a query request with an associated baseline; compare the baseline associated with the query request and the stored baseline; and provide the changed PFD rule based on the comparing and the stored baseline.

In one embodiment, the above apparatuses are implemented in a Unified Data Repository (UDR) or a Packet Flow Description Function (PFDF) entity; and the baseline is a version reference or a time stamp.

In yet another embodiment, there proposes a computer readable medium comprising computer readable code, which when run on an apparatus, causes the apparatus to perform any of the above method.

With embodiments herein, the advantages may be achieved:

- The embodiments herein may allow the network operator to support the PFD Management procedure in a very efficient way, by optimizing the delivery of PFD rules, by reducing the amount of signaling, and by reducing the number of hops between the producer (AF) and the consumer (UPF).
- The embodiments herein may remove the signaling, processing and memory impacts related to PFD Management in the SMF, increasing its available capacity to handle PFCP management procedures.
- The embodiments herein may reduce the signaling requirements related to PFD Management by half in the operator network.
- The embodiments herein may prevent overloading the receiver of PFD Management information and the communication channel between the producer and the receiver. As a consequence, the impacts on the NEF are also minimized.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

The embodiments herein propose an optimized procedure for PFD Management which optimizes the delivery of PFD rules, by reducing the amount of signaling and by reducing the number of hops between the producer (AF) and the consumer (UPF).

Figure 1:
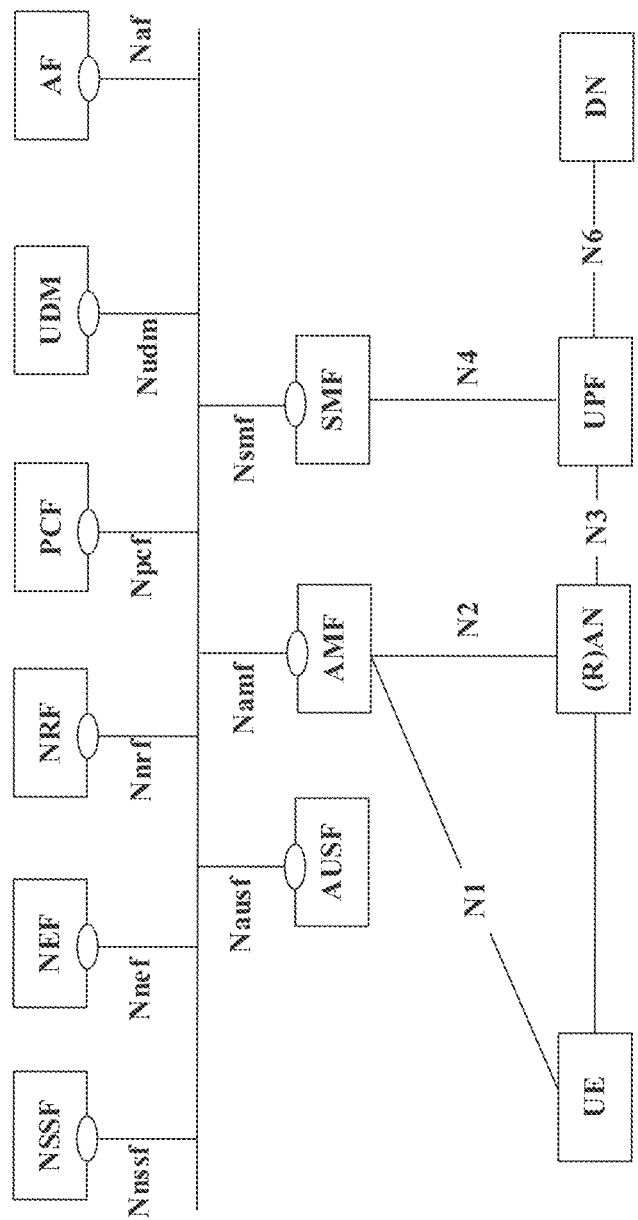
FIG. 1 is a schematic block diagram showing the 5G reference architecture as defined by 3GPP.
Figure 2:
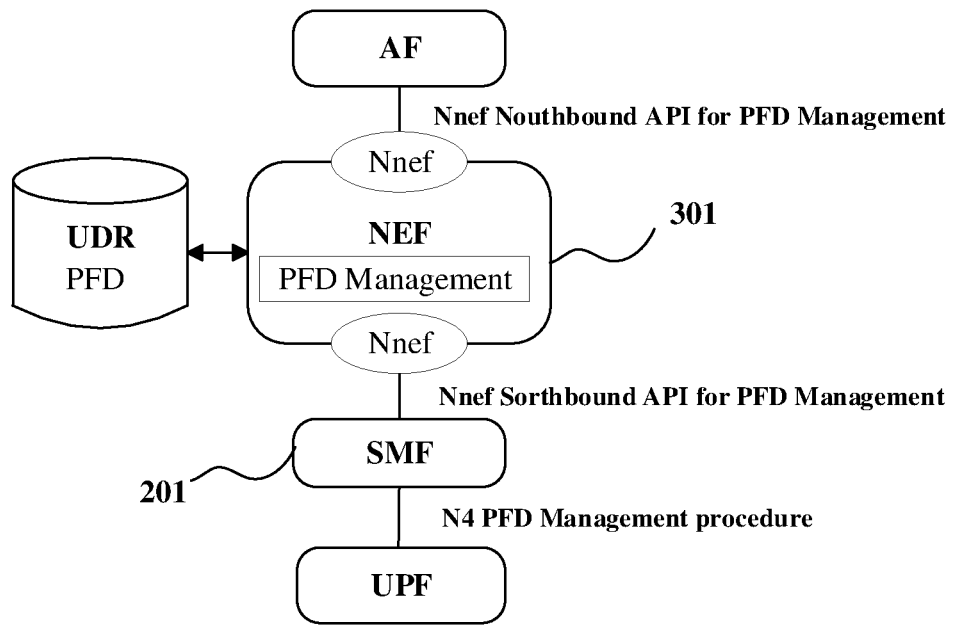
FIG. 2 is a schematic block diagram showing the 5GC PFD management.
Figure 3:
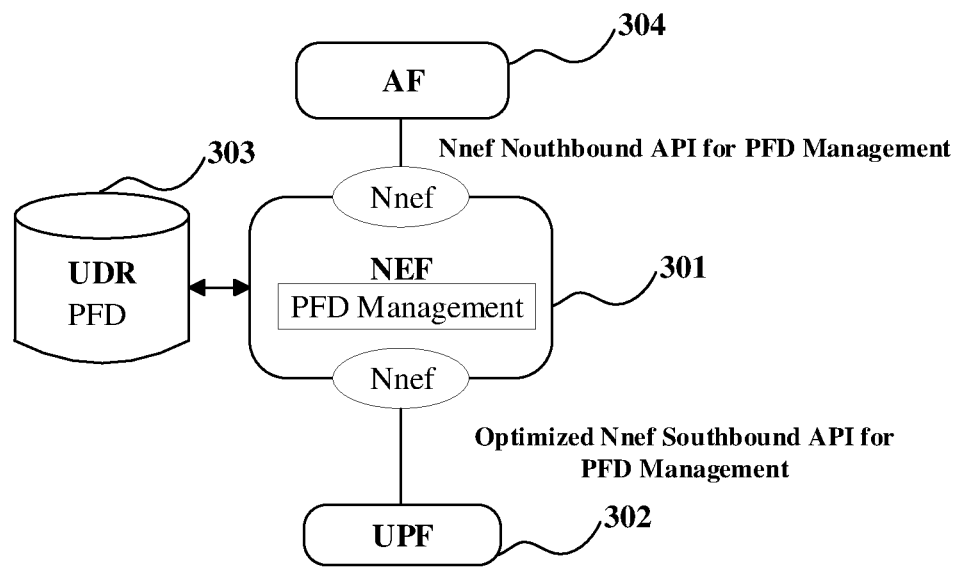
FIG. 3 is a schematic block diagram showing an example communication system, in which the embodiments herein can be implemented.

FIG. 3 is a schematic block diagram showing an example communication system, in which the embodiments herein can be implemented.

In example communication system of one embodiment, as shown in FIG. 3, the proposed solution is based on different extensions of the Nnef Southbound API for PFD Management, specifically:

Add support for UPF as consumer for the NEF PFD Management service (through Nnef Southbound API for PFD Management). Currently SMF 201 is the only consumer.

Optimized Nnef Southbound API for PFD Management, consisting of:
Optimized Push procedure: by proposing a notification push, where UPF subscribes to NEF on PFD notification for a list of appIds. And NEF notifies UPF accordingly but not passing the PFDs (thus leaving UPF to decide to retrieve them or not). Additionally, UPF can subscribe to NEF on PFD deltas (with respect to a certain baseline) for a list of appIds.

Optimized Pull procedure: by proposing UPF to request NEF for PFD rules for a list of appIds and indicating in the request interest either in partial updates or full updates. In the case of partial updates, UPF indicating the baseline so NEF is able return a partial update with respect to that baseline.

Optimized Combined Push-Pull procedure: by proposing UPF to subscribe to NEF on PFD notification for a list of appIds, and, when needed (e.g. during the O&M maintenance window or at PDU session establishment with a PCC rule with a certain appId), UPF pulling the partial PFDs.

Optimized Push Procedure

Figure 4A:
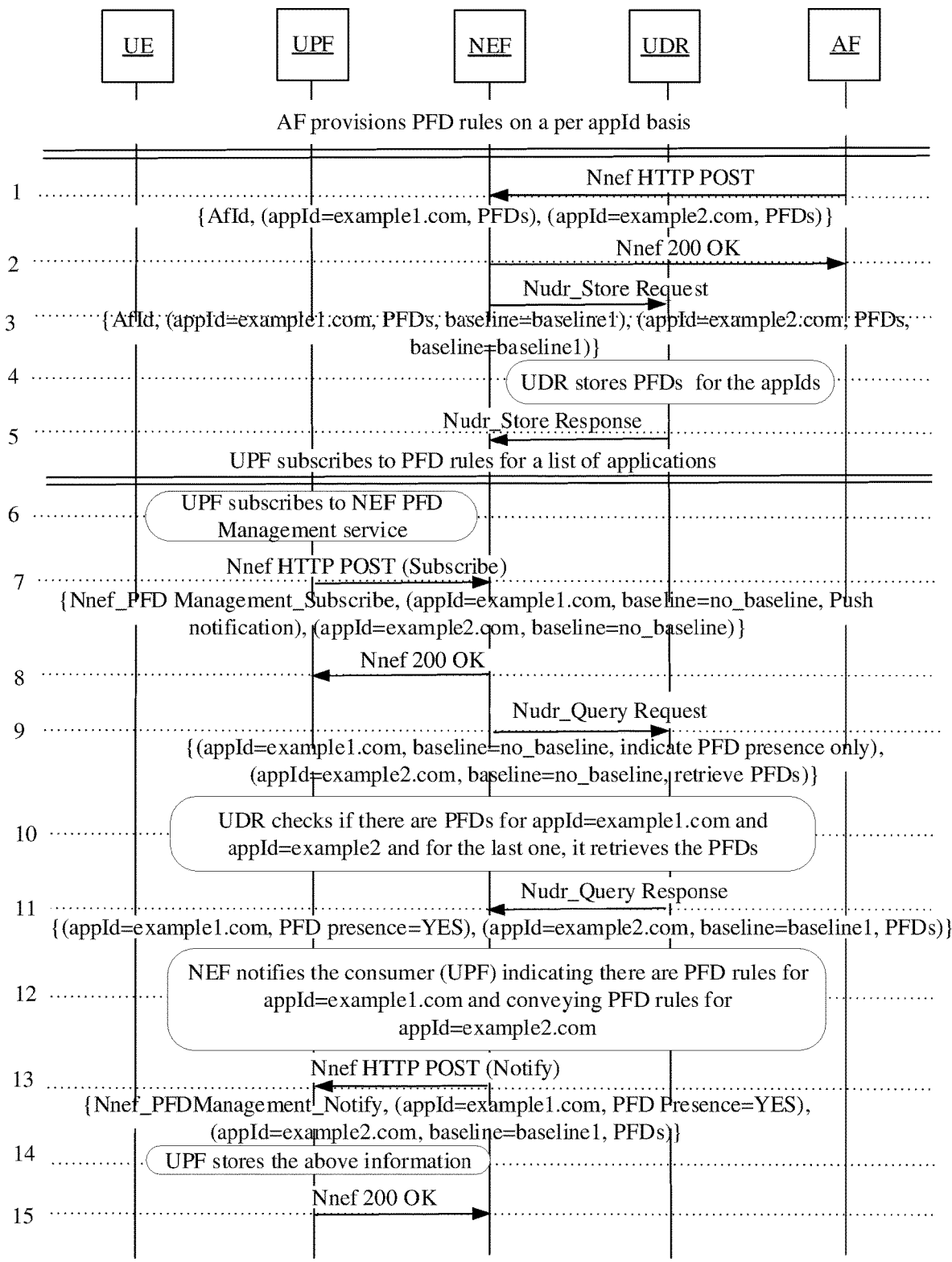
FIGS. 4A-4B are schematic sequence diagrams showing the proposed push procedure, according to the embodiments herein.
Figure 4B:
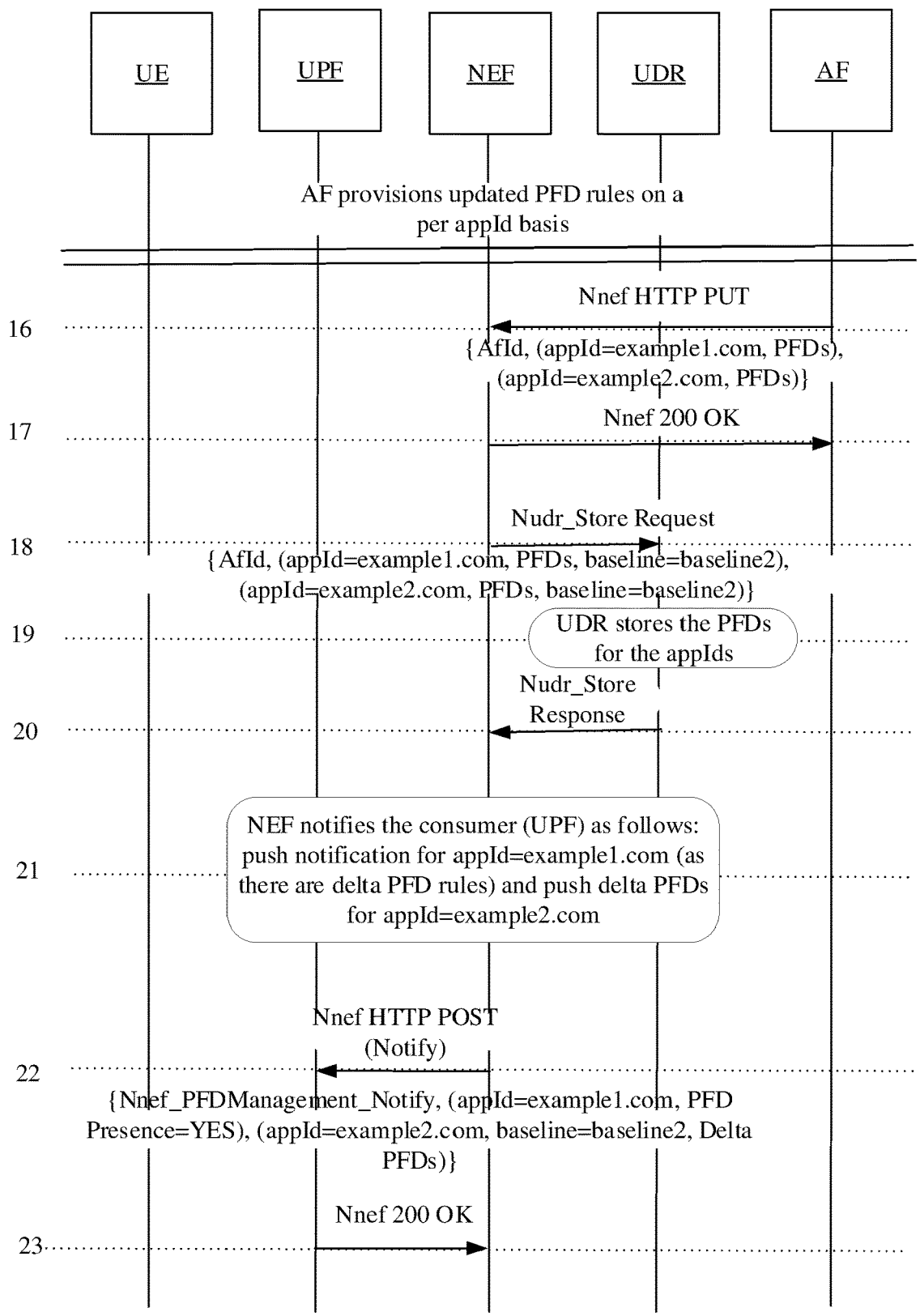

FIGS. 4A-4B are schematic sequence diagrams showing the proposed push procedure, according to the embodiments herein. Steps are detailed below:

Step 1) AF provisions PFD rules for a set of applications (e.g. example1.com, example2.com), through Nnef Northbound API for PFD Management by triggering an HTTP POST request including: AfId, (appId=example1.com, PFDs), (appId=example2.com, PFDs).

It is assumed there is a NEF serving the AF (i.e. AF provisions PFDs for a certain application towards that NEF).

Step 2) NEF (PFD Management service) acknowledges the request with a Nnef 200 OK message.

Steps 3, 4 and 5) NEF (PFD Management service) requests UDR to store the PFDs for the applications received in Step 1 above. NEF setting up a baseline (e.g. baseline 1, as this is the first version of the PFDs from the AF) for the PFDs on a per application basis. The baseline can be a version reference or a timestamp. UDR stores the PFDs and acknowledges the request (indicating successful operation).

Steps 6 and 7) UPF subscribes to NEF PFD Management service in order to retrieve the PFD rules for a certain set of applications. It is proposed for UPF to be configured with two different lists of appIds:

List of appIds corresponding to commonly used applications (e.g. Facebook, YouTube, Netflix, etc.).

List of appIds corresponding to non-commonly used applications.

Based on the above, it is proposed that UPF subscribes to both lists above as follows:

For the first list above, UPF subscribes in order to retrieve the PFDs (in case UPF has a previously stored version of the PFDs for a certain appId, UPF indicating the baseline in order to retrieve the delta, i.e. the updated PFDs with respect to the baseline).

For the second list above, UPF subscribes only to receive an indication on the presence of PFDs (in case UPF has a previously stored version of the PFDs for a certain appId, UPF indicating the baseline in order to receive an indication of the presence of updated PFDs with respect to that baseline).

In order to do this, it is proposed to extend the Nnef Southbound API for PFD Management (Push procedure) as follows:

On a per appId basis, and according to the baseline, UPF requesting either the PFDs or just an indication on the presence of updated PFDs.

In this example, UPF triggers a HTTP POST message indicating a subscribe operation to PFD Management service (Nnef_PFDManagement_Subscribe) and including as parameters:

appId=example1.com, baseline=no_baseline, Push notification appId=example2.com, baseline=no_baseline In this example, as UPF has no previously stored PFDs for the appIds, UPF indicates no_baseline.

It is assumed there is a NEF serving the AF (i.e. AF provisions PFDs for a certain application towards that NEF) and that UPF discovers that NEF on a per application basis.

Step 8) After receiving the message in previous step, the NEF responds back to UPF with a Nnef 200 OK successful response.

Step 9) NEF (PFD Management service) triggers Nudr_Query Request message towards UDR to ask if there are updated PFDs (according to the baseline) for appId=example1.com and to directly retrieve the updated PFDs (according to the baseline) for appId=example2.com.

Steps 10 and 11) UDR checks if there are updated PFDs (according to the baseline) for appId=example1.com and appId=example2, and for the last one it directly retrieves the updated PFDs (according to the baseline) and indicated the latest baseline (baseline1): (appId=example1.com, PFD presence=YES), (appId=example2.com, PFDs, baseline=baseline1).

Steps 12 and 13) NEF notifies the consumer (UPF) indicating there are updated PFD rules (according to the baseline) for appId=example1.com and conveying the updated PFD rules (according to the baseline) and the latest baseline for appId=example2.com, by triggering a Nnef_PFDManagement Notify message, including: (appId=example1.com, PFD Presence=YES), (appId=example2.com, PFDs, baseline=baseline1).

Steps 14 and 15) UPF stores the information received in previous step (e.g. it might later on during the O&M maintenance window, retrieve the updated PFDs for appId=example1.com) and responds back to NEF with a Nnef 200 OK successful response.

Step 16) AF provisions updated PFD rules for a set of applications (e.g. example1.com, example2.com), through Nnef Northbound API for PFD Management by triggering an HTTP POST request including: AfId, (appId=example1.com, PFDs), (appId=example2.com, PFDs).

Step 17) NEF (PFD Management service) acknowledges the request with a Nnef 200 OK message.

Steps 18, 19 and 20) NEF (PFD Management service) requests UDR to store the PFDs for the applications received in Step 14 above. NEF setting up a new baseline (e.g. baseline 2, as this is the second version of the PFDs from the AF) for the PFDs on a per application basis. The baseline can be a version reference or a timestamp. UDR stores the PFDs and acknowledges the request (indicating successful operation).

Steps 21 and 22) NEF notifies the consumer (UPF) as follows: a Push notification for appId=example1.com (indicating there are delta PFD rules with respect to the previous baseline=baseline1) and a Push including the delta PFDs (between baseline1 and baseline2) and the latest baseline (baseline2) for appId=example2.com. In order to do this, NEF triggers towards UPF a Nnef_PFDManagement_Notify message, including: (appId=example1.com, PFD Presence=YES), (appId=example2.com, baseline=baseline2, Delta PFDs).

Note that, the AF, UDR, NEF, UPF in FIGS. 4A and 4B may be configured as the AF 304, the UDR 303, the NEF 301, and the UPF 302 in FIG. 3.

Optimized Pull Procedure

Figure 5:
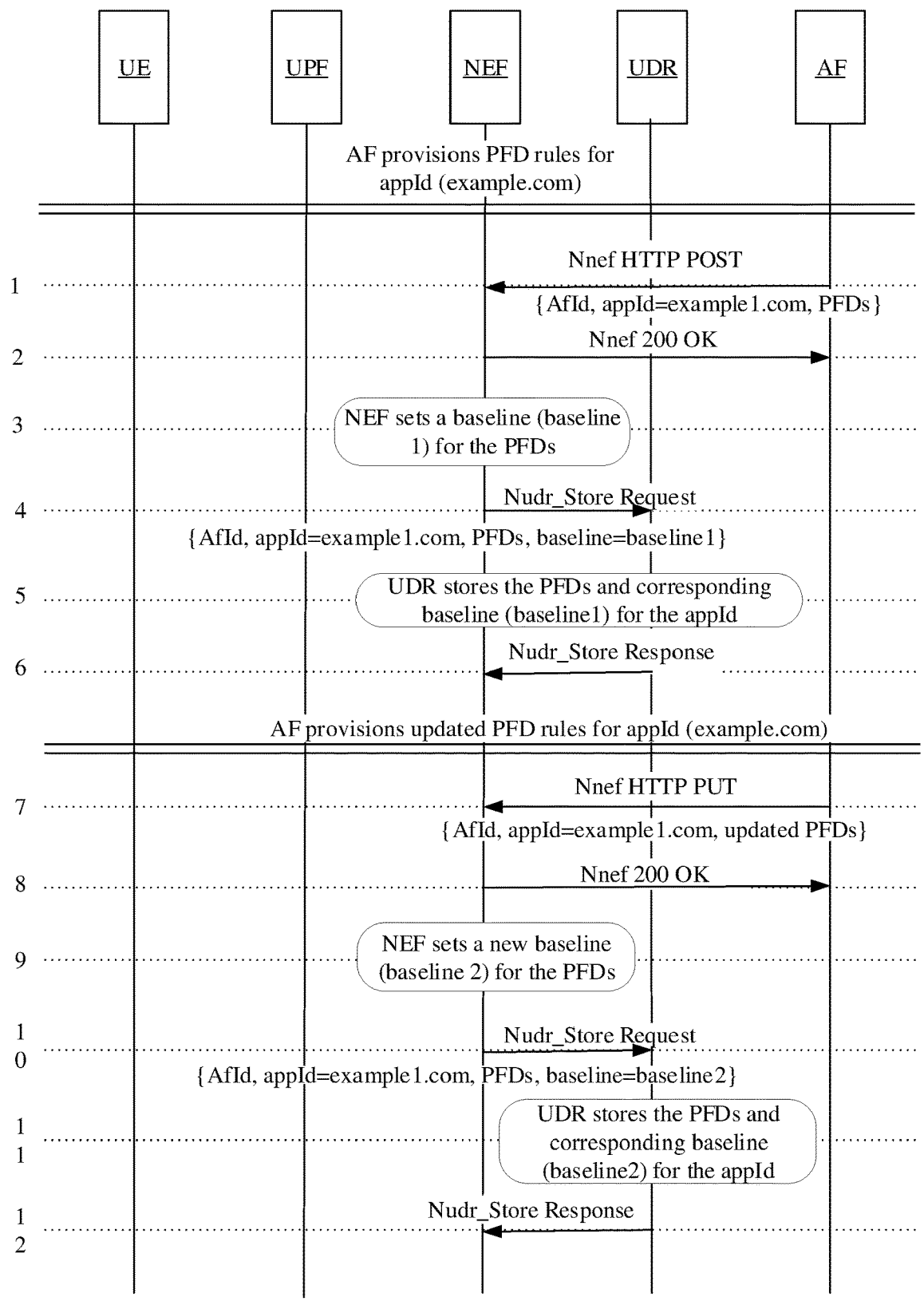
FIG. 5 is a schematic sequence diagram showing the proposed PFD storage in UDR, according to the embodiments herein.

The proposed embodiments are based on PFD storage in UDR including the corresponding baseline. FIG. 5 is a schematic sequence diagram showing the proposed PFD storage in UDR, according to the embodiments herein. Steps are detailed below:

Step 1) AF provisions PFD rules for certain application (e.g. example1.com), through Nnef Northbound API for PFD Management by triggering an HTTP POST request including: And, (appId=example1.com, PFDs).

It is assumed there is a NEF serving the AF (i.e. AF provisions PFDs for a certain application towards that NEF).

Step 2) NEF (PFD Management service) acknowledges the request with a Nnef 200 OK message.

Steps 3 and 4) NEF sets a baseline (baseline1) for the PFDs received in Step 1 above and requests UDR to store the PFDs for the application (example.com) including the baseline (baseline1). The baseline can be a version reference or a timestamp.

Steps 5 and 6) UDR stores the PFDs together with the corresponding baseline (baseline1) as Application Data (appId=example.com) and acknowledges the request (indicating successful operation).

Step 7) After some time (e.g. 1 week) AF provisions updated PFD rules for the application (e.g. example1.com), through Nnef Northbound API for PFD Management by triggering an HTTP PUT request including: AfId, (appId=example1.com, PFDs).

Step 8) NEF (PFD Management service) acknowledges the request with a Nnef 200 OK message.

Steps 9 and 10) NEF sets a new baseline (baseline2) for the PFDs received in Step 7 above and requests UDR to store the PFDs for the application (example.com) including the baseline (baseline2).

Step 11 and 12) UDR stores the PFDs together with the corresponding baseline (baseline2) as Application Data (appId=example.com) and acknowledges the request (indicating successful operation).

Note that, the AF, UDR, NEF, UPF in FIG. 5 may be configured as the AF 304, the UDR 303, the NEF 301, and the UPF 302 in FIG. 3.

Figure 6A:
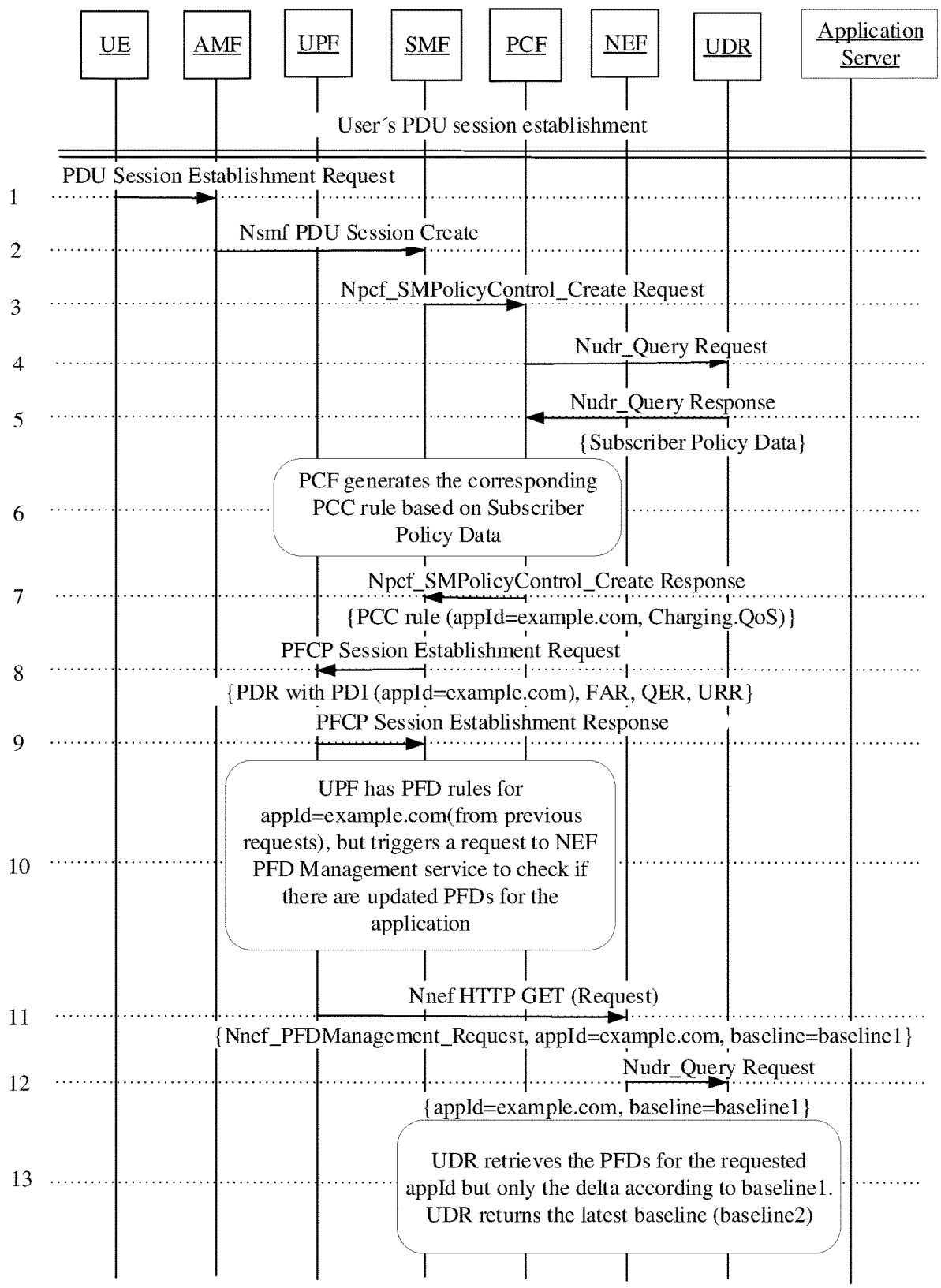
FIGS. 6A-6B are schematic sequence diagrams showing the proposed pull procedure, according to the embodiments herein.
Figure 6B:
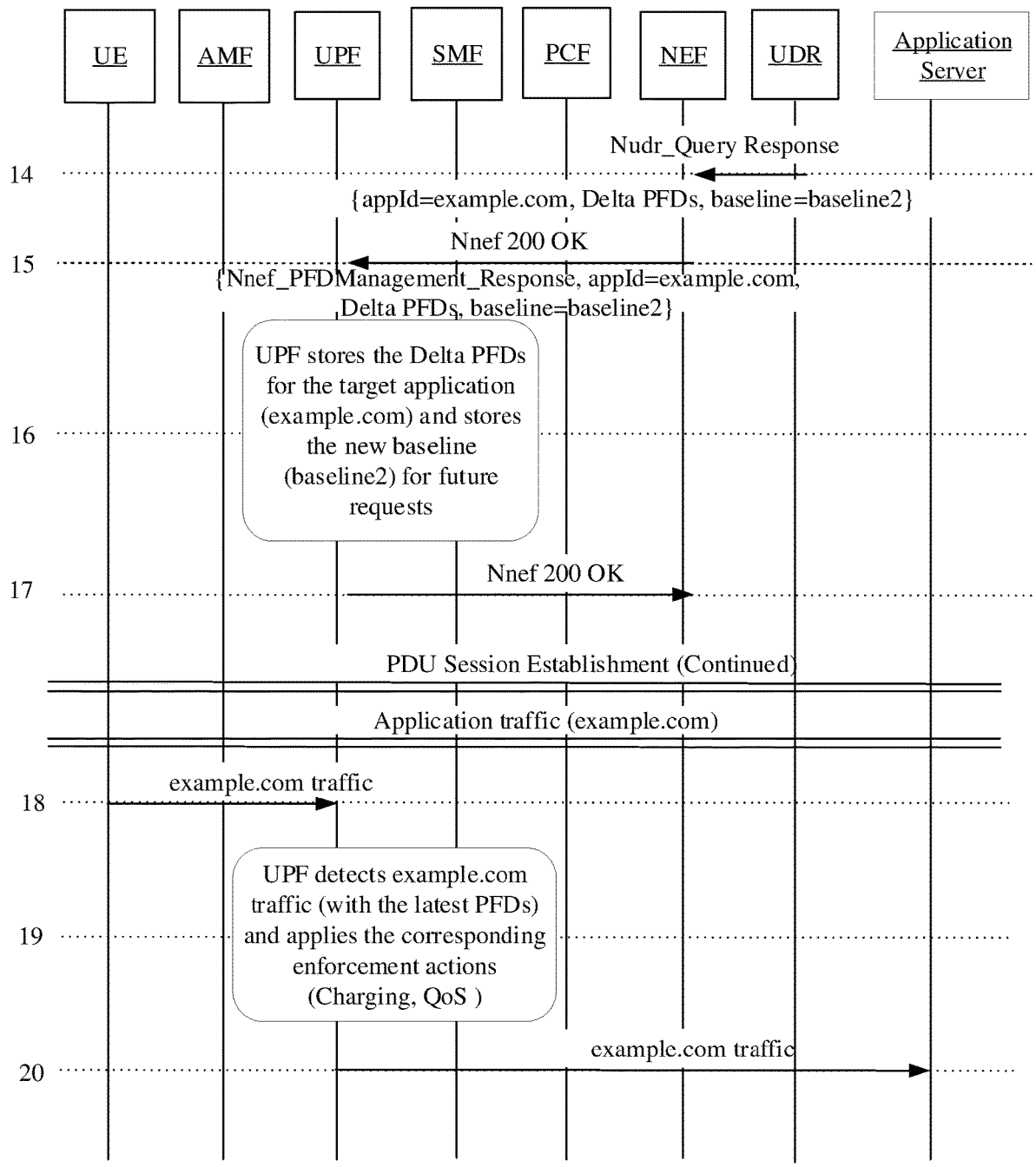

FIGS. 6A-6B are a schematic sequence diagrams showing the proposed pull procedure, according to the embodiments herein. Steps are detailed below:

Precondition: UPF has PFDs stored for appId=example.com, according to baseline1 (see FIG. 5 above).

Steps 1 and 2) UE triggers PDU session establishment, by means of sending a PDU Session Establishment Request to AMF. AMF selects an SMF to manage the PDU session (the SMF selection function in the AMF selects an SMF instance based on the available SMF instances obtained from NRF or on the configured SMF information in the AMF) and triggers Nsmf PDU Session Create. Note the sequence diagram in FIG. 5 does not include all the signaling messages involved in the PDU Session Establishment procedure. The relevant signaling messages for this disclosure are described in subsequent steps.

Step 3) SMF triggers Npcf_SMPolicyControl_Create Request message to retrieve SM policies for the user PDU session.

Step 4) PCF triggers Nudr_Query Request message to retrieve the policy data for this use PDU session.

Step 5) UDR answers with Nudr_Query Response message including the Subscriber Policy Data.

Step 6) PCF generates the corresponding PCC rule(s) based on Subscriber Policy Data.

Step 7) Based on the above, PCF triggers Npcf_SMPolicyControl_Create Response message including the PCC rules to be applied for this user PDU session. In this case, there will be a PCC rule for appId=example.com, including some enforcement actions (Charging and QoS).

Step 8) SMF selects UPF and triggers PFCP Session Establishment Request message including the corresponding PDRs/FARs/QERs/URRs. In this case, there will be a PDR with PDI of type application with appId=example.com, and a corresponding FAR, QER and URR.

Step 9) UPF stores the PDRs/FARs/QERs/URRs and answers back to SMF with a PFCP Session Establishment Response message.

Steps 10 and 11) Based on the PDRs received in Step 8 above, in this case a PDR with appId=example.com, UPF checks if it has previously stored PFD rules for appId=example.com (from any previous requests). If this example, UPF has stored the PFD rules according to baseline1 and it is proposed that UPF triggers a request to NEF PFD Management service for appId=example.com, indicating "partial GET request" and including the baseline (baseline1), i.e. UPF requesting only delta change (new, updated, removed PFDs) between baseline1 and the latest baseline, which in this example is baseline2.

It is assumed there is a NEF serving the AF (i.e. AF provisions PFDs for a certain application towards that NEF) and that UPF discovers that NEF on a per application basis.

Step 12) NEF (PFD Management service) triggers Nudr_Query Request message to UDR to retrieve the delta PFDs for appId=example.com, by including the baseline (baseline1).

Steps 13 and 14) UDR retrieves the PFDs for the requested appId (example.com) but only the delta according to baseline1 (i.e. the PFDs between the requested baseline: baseline1 and the latest baseline: baseline2). UDR answers with Nudr_Query Response message including the Delta PFDs and the latest baseline (baseline2).

Step 15) After receiving the message in previous step, the NEF responds back to UPF with a Nnef 200 OK successful response, including the Delta PFDs and the latest baseline (baseline2).

Step 16 and 17) UPF consolidates the Delta PFDs with its stored PFDs for the target application (example.com) and the latest baseline (baseline2) for future requests. UPF responds back to NEF with a Nnef 200 OK successful response.

Steps 18 and 19) User opens example.com application. UPF detects example.com traffic by matching the incoming packets with the PDR with PDI of type application with appId=example.com (with the latest PFDs) and applies the corresponding enforcement actions indicated in FAR, QER and URR (Charging, QoS).

Step 20) UPF forwards the traffic to the Application Server according to the FAR.

Note that, the AF, UDR, NEF, UPF in FIGS. 6A and 6B may be configured as the AF 304, the UDR 303, the NEF 301, and the UPF 302 in FIG. 3.

Optimized Combined Push-Pull Procedure

Figure 7A:
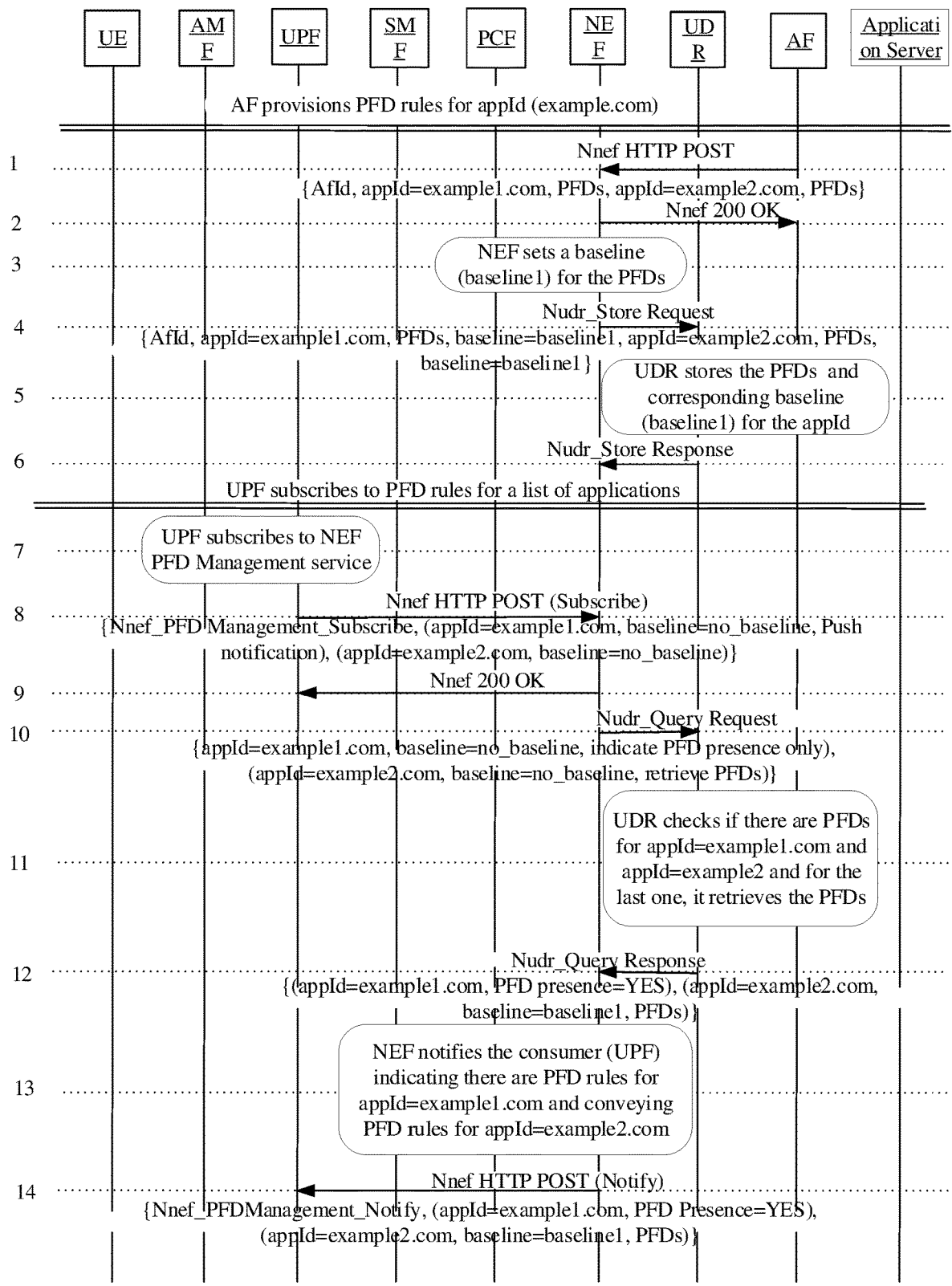
FIGS. 7A-7C are schematic sequence diagrams showing the proposed combined push-pull procedure, according to the embodiments herein.
Figure 7B:
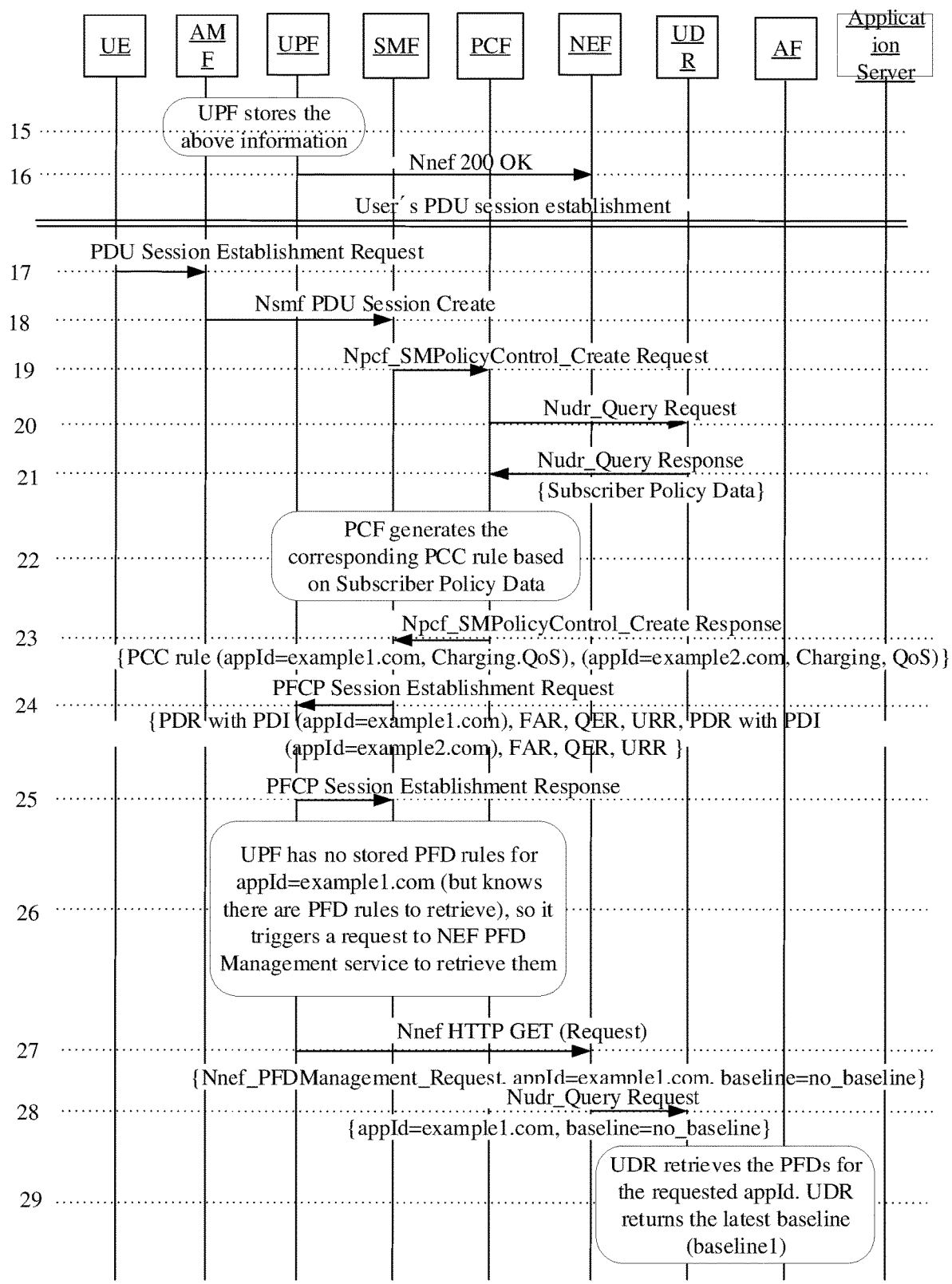
Figure 7C:
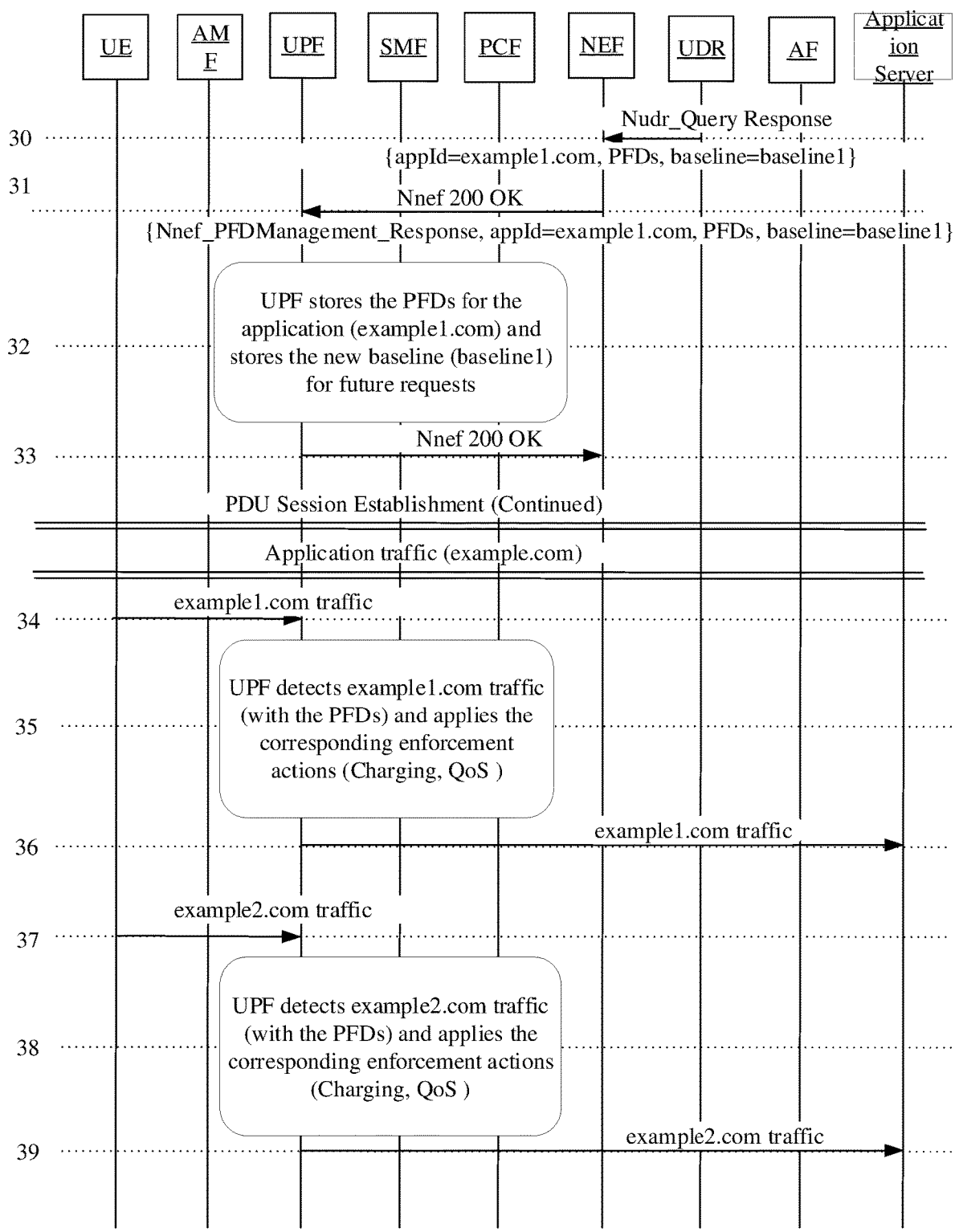

FIGS. 7A-7C are schematic sequence diagrams showing the proposed combined push-pull procedure, according to the embodiments herein. Steps are detailed below:

Step 1) AF provisions PFD rules for a set of applications (e.g. example1.com, example2.com), through Nnef Northbound API for PFD Management by triggering an HTTP POST request including: AfId, (appId=example1.com, PFDs), (appId=example2.com, PFDs).

It is assumed there is a NEF serving the AF (i.e. AF provisions PFDs for a certain application towards that NEF).

Step 2) NEF (PFD Management service) acknowledges the request with a Nnef 200 OK message.

Steps 3 and 4) NEF sets a baseline (baseline1) for the PFDs received in Step 1 above and requests UDR to store the PFDs for the applications including the baseline (baseline1). The baseline can be a version reference or a timestamp.

Steps 5 and 6) UDR stores the PFDs together with the corresponding baseline (baseline1) as Application Data and acknowledges the request (indicating successful operation).

Steps 7 and 8) UPF subscribes to NEF PFD Management service in order to retrieve the PFD rules for a certain set of applications. It is proposed for UPF to be configured with two different lists of appIds:

List of appIds corresponding to commonly used applications (e.g. Facebook, YouTube, Netflix, etc.).

List of appIds corresponding to non-commonly used applications.

Based on the above, it is proposed that UPF subscribes to both lists above as follows:

For the first list above, UPF subscribes in order to retrieve the PFDs (in case UPF has a previously stored version of the PFDs for a certain appId, UPF indicating the baseline in order to retrieve the delta, i.e. the updated PFDs with respect to the baseline).

For the second list above, UPF subscribes only to receive an indication on the presence of PFDs (in case UPF has a previously stored version of the PFDs for a certain appId, UPF indicating the baseline in order to receive an indication of the presence of updated PFDs with respect to that baseline).

In order to do this, it is proposed to extend the Nnef Southbound API for PFD Management (Push procedure) as follows:

On a per appId basis, and according to the baseline, UPF requesting either the PFDs or just an indication on the presence of updated PFDs.

In this example, UPF triggers a HTTP POST message indicating a subscribe operation to PFD Management service (Nnef_PFDManagement_Subscribe) and including as parameters:

appId=example1.com, baseline=no_baseline, Push notification appId=example2.com, baseline=no_baseline In this example, as UPF has no previously stored PFDs for the appIds, UPF indicates no_baseline.

It is assumed there is a NEF serving the AF (i.e. AF provisions PFDs for a certain application towards that NEF) and that UPF discovers that NEF on a per application basis.

Step 9) After receiving the message in previous step, the NEF responds back to UPF with a Nnef 200 OK successful response.

Step 10) NEF (PFD Management service) triggers Nudr_Query Request message towards UDR to ask if there are updated PFDs (according to the baseline) for appId=example1.com and to directly retrieve the updated PFDs (according to the baseline) for appId=example2.com.

Steps 11 and 12) UDR checks if there are updated PFDs (according to the baseline) for appId=example1.com and appId=example2, and for the last one it directly retrieves the updated PFDs (according to the baseline) and indicated the latest baseline (baseline1): (appId=example1.com, PFD presence=YES), (appId=example2.com, PFDs, baseline=baseline1).

Steps 13 and 14) NEF notifies the consumer (UPF) indicating there are updated PFD rules (according to the baseline) for appId=example1.com and conveying the updated PFD rules (according to the baseline) and the latest baseline for appId=example2.com, by triggering a Nnef_PFDManagement_Notify message, including: (appId=example1.com, PFD Presence=YES), (appId=example2.com, PFDs, baseline=baseline1).

Steps 15 and 16) UPF stores the information received in previous step (e.g. it might later on during the O&M maintenance window, retrieve the updated PFDs for appId=example1.com) and responds back to NEF with a Nnef 200 OK successful response.

Steps 17 and 18) UE triggers PDU session establishment, by means of sending a PDU Session Establishment Request to AMF. AMF selects an SMF to manage the PDU session (the SMF selection function in the AMF selects an SMF instance based on the available SMF instances obtained from NRF or on the configured SMF information in the AMF) and triggers Nsmf PDU Session Create. Note the sequence diagram in FIGS. 7A-7C does not include all the signaling messages involved in the PDU Session Establishment procedure. The relevant signaling messages for this disclosure are described in subsequent steps.

Step 19) SMF triggers Npcf_SMPolicyControl_Create Request message to retrieve SM policies for the user PDU session.

Step 20) PCF triggers Nudr_Query Request message to retrieve the policy data for this use PDU session.

Step 21) UDR answers with Nudr_Query Response message including the Subscriber Policy Data.

Step 22) PCF generates the corresponding PCC rule(s) based on Subscriber Policy Data.

Step 23) Based on the above, PCF triggers Npcf_SMPolicyControl_Create Response message including the PCC rules to be applied for this user PDU session. In this case, there will be a PCC rule for appId=example1.com, including some enforcement actions (Charging and QoS) and another PCC rule for appId=example2.com, including some enforcement actions (Charging and QoS).

Step 24) SMF selects UPF and triggers PFCP Session Establishment Request message including the corresponding PDRs/FARs/QERs/URRs. In this case, there will be a PDR with PDI of type application with appId=example1.com, and a corresponding FAR, QER and URR and another a PDR with PDI of type application with appId=example2.com, and a corresponding FAR, QER and URR.

Step 25) UPF stores the PDRs/FARs/QERs/URRs and answers back to SMF with a PFCP Session Establishment Response message.

Steps 26 and 27) Based on the PDRs received in Step 24 above, in this case a PDR with appId=example1.com and another PDR with appId=example2.com, UPF checks if it has previously stored PFD rules for those applications (from any previous requests). In this example, UPF has stored PFD rules for appId=example2.com (and no PFD push notification, so they are updated). Additionally, UPF has no stored PFD rules for appId=example1.com (but knows there are PFD rules to retrieve), so it triggers a request to NEF PFD Management service to retrieve them. Alternatively, UPF might retrieve the PFD rules later on, in order to avoid signaling overload.

Step 28) NEF (PFD Management service) triggers Nudr_Query Request message to UDR to retrieve the PFDs for appId=example1.com, by including the baseline (no_baseline).

Steps 29 and 30) UDR retrieves the PFDs for the requested appId (example1.com). UDR answers with Nudr_Query Response message including the PFDs and the latest baseline (baseline1).

Step 31) After receiving the message in previous step, the NEF responds back to UPF with a Nnef 200 OK successful response, including the PFDs and the latest baseline (baseline1).

Step 32 and 33) UPF stores the PFDs for the application (example1.com) and stores the new baseline (baseline1) for future requests. UPF responds back to NEF with a Nnef 200 OK successful response.

Steps 34 and 35) User opens example1.com application. UPF detects example1.com traffic by matching the incoming packets with the PDR with PDI of type application with appId=example1.com (with the latest PFDs) and applies the corresponding enforcement actions indicated in FAR, QER and URR (Charging, QoS).

Step 36) UPF forwards the traffic to the Application Server according to the FAR.

Steps 37 and 38) User opens example2.com application. UPF detects example2.com traffic by matching the incoming packets with the PDR with PDI of type application with appId=example2.com (with the latest PFDs) and applies the corresponding enforcement actions indicated in FAR, QER and URR (Charging, QoS).

Step 39) UPF forwards the traffic to the Application Server according to the FAR.

By the embodiments above, the following technical effect can be achieved:

The embodiments herein may allow the network operator to support the PFD Management procedure in a very efficient way, by optimizing the delivery of PFD rules, by reducing the amount of signaling, and by reducing the number of hops between the producer (AF) and the consumer (UPF).

The embodiments herein may remove the signaling, processing and memory impacts related to PFD Management in the SMF, increasing its available capacity to handle PFCP management procedures.

The embodiments herein may reduce the signaling requirements related to PFD Management by half in the operator network.

The embodiments herein may prevent overloading the receiver of PFD Management information and the communication channel between the producer and the receiver. As a consequence, the impacts on the NEF are also minimized.

Note that, the AF, UDR, NEF, UPF in FIGS. 7A, 7B and 7C may be configured as the AF 304, the UDR 303, the NEF 301, and the UPF 302 in FIG. 3.

Figure 8:
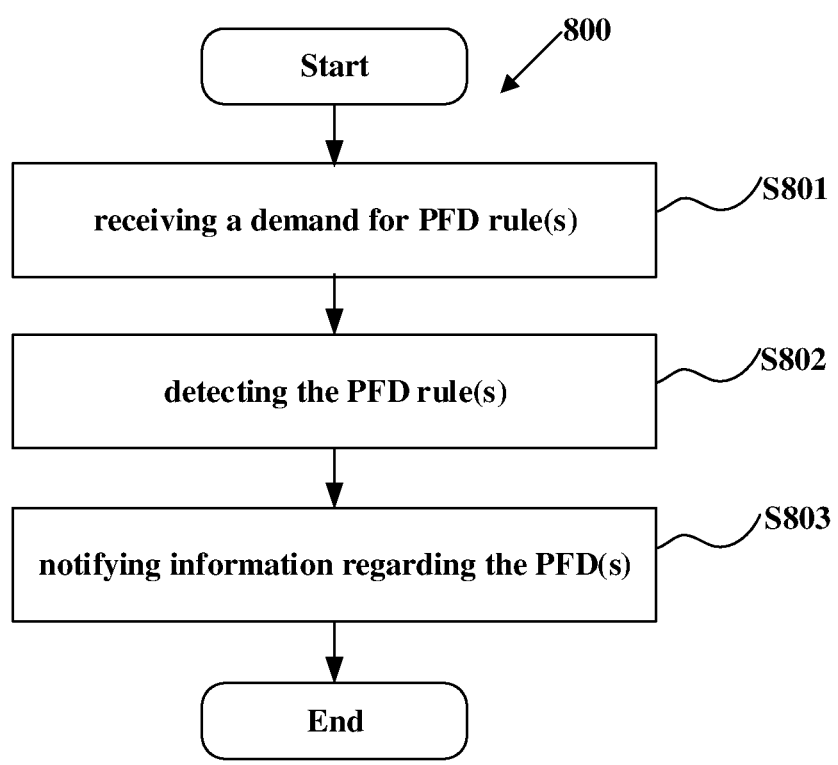
FIG. 8 is a schematic flow chart showing an example PFD management method in the NEF, according to the embodiments herein.

FIG. 8 is a schematic flow chart showing an example PFD management method in the NEF, according to the embodiments herein. In one embodiment, the flow chart in FIG. 8 can be implemented in the NEF in FIGS. 3-7C.

The method 800 may begin with step S801, in which the NEF 301 may receive from the UPF 302 a demand message indicating the demand for at least one PFD rule for an application.

In one embodiment, the demand message may indicate a subscription of the PFD management service. That is, as shown in FIGS. 4A-4B and FIG. 7A-7C, the UPF 302 may subscribe to NEF PFD management service, so that whenever the NEF 301 receive a new version of the PFD (new baseline) from the AF 304, the NEF 301 may notify the UPF 302 about the new version (push).

In one embodiment, the demand message (subscription in this embodiment) may include a baseline or no baseline. That is, if the UPF 302 has an older version (baseline) of the PFD for this application, the UPF 302 may indicate the baseline in the subscription; as a result the NEF 301 may only indicate the changed (added, deleted, or updated) PFD to the UPF 302. Otherwise, if the UPF 302 does not have any version (baseline) of the PFD for this application, the UPF 302 may indicate no baseline.

In one embodiment, the demand message (subscription in this embodiment) may include push notification demand, so that the NEF 301 may only transmit a push notification to the UPF 302 if any new version is received, then the UPF 302 may download the PFD rules in an available time. For example, the UPF 302 may retrieve the notified PFD rule during an Operation and Maintenance (O&M) maintenance window or at Packet Data Unit (PDU) session establishment, as shown in FIGS. 4A-4B and 7A-7C.

In one embodiment, the push notification demand may be applied only to the application not frequently used. For application frequently used, the NEF 301 may push the PFD rule(s), so that the UPF 302 may obtain the PFD rule(s) immediately.

In one embodiment, the demand message may indicate a request of the PFD management service, as shown in FIGS. 6A-6B and 7A-7C. That is, the UPF 302 may ask (request) the NEF 301 to provide the PFD for an application (pull).

In one embodiment, the demand message (PFD request in this embodiment) may include a baseline or no baseline, similar to the push scenario.

In one embodiment, the UPF 302 may send the demand message one than once, as shown in FIG. 7C-7C. That is, the UPF 302 may send the pull request even the push subscription is successful. Furthermore, the UPF 302 may send the pull request and/or the push subscription repeatedly.

In one embodiment, the method 800 may also include steps of receiving the PFD rules from the AF 304 and store them into the UDR 303, although not shown in FIG. 8. These steps may be performed at the same time as the steps shown in FIG. 8, or may be performed before or after the steps shown in FIG. 8. Furthermore, these steps may be performed repeatedly. That is, whenever the NEF 301 receives PFD rule(s) from the AF 304, it stores the received PFD rule(s) into the UDR 303.

In one embodiment, the NEF 301 may receive one or more PFD rules for one or more applications from the AF 304. Then, the NEF 301 may associate a baseline with one or more PFD rules for the same application. The baseline may be a version number or a time stamp.

In one embodiment, the NEF 301 may request the UDR 303 to store the one or more PFD rules for the application and the associated baseline.

Then, the method 800 may proceed to step S802, in which the NEF 301 may detect the at least one PFD rule for the application, in response to the received demand message from the UPF 302.

In one embodiment, upon receiving the demand message (either subscription or request) from the UPF 302, the NEF 301 may detect the at least one PFD rule for the application by checking the UDR 303. In one embodiment, the NEF 301 may query the UDR 303 for the at least one PFD rule based on the baseline received in the demand message (either subscription or request) from the UPF. Then, in response to the querying from the NEF 301, the UDR 303 may compare the baseline associated with the query request and the baseline stored in the UDR 303 for this application, and may determine whether there is new baseline (e.g., new version) for this application. In particular, if the demand message (either subscription or request) indicates no baseline and thus the query request indicates no baseline accordingly, then the UDR 303 may determine that the stored PFD rule(s) will be the new version. The UDR 303 may provide the changed PFD rule(s), if a new baseline is found. The UDR 303 may also provide the baseline (e.g. version number or time stamp).

In one embodiment, in response to the successful subscription of the PFD management service for UPF 302, the NEF 301 may detect if any new version of PFD rule(s) is received from the AF 304. For example, whenever receiving PFD rule(s) from the AF 304, the NEF 301 may set up a new baseline for the PFD rule(s), at the same time, the NEF 301 may detect the updated PFD rule based on the new baseline associated with the one or more PFD rules received from the AF and the baseline received in the demand message from the UPF. In particular, the NEF 301 may compare the PFD rule(s) received from the AF 304 (that is associated with the new baseline) with PFD rule(s) associated the baseline indicated in the subscription message. The NEF 301 may query the UDR 303 for PFD rule(s) associated the baseline indicated in the subscription message, if necessary.

Then, the method 800 may proceed to step S803, in which the NEF 301 may notify information regarding the at least one PFD rule to the UPF 302.

In one embodiment, depending on the demand message from the UPF 302, the NEF 302 may either notify the existence of the changed PFD rule (partial PFD rule) and the latest baseline to the UPF 302, or transmit the changed PFD rule along with the notification.

The above steps are only examples, and the NEF 301 may perform any actions described in connection to FIGS. 3-7C, to manage the PFD rule(s).

Figure 9:
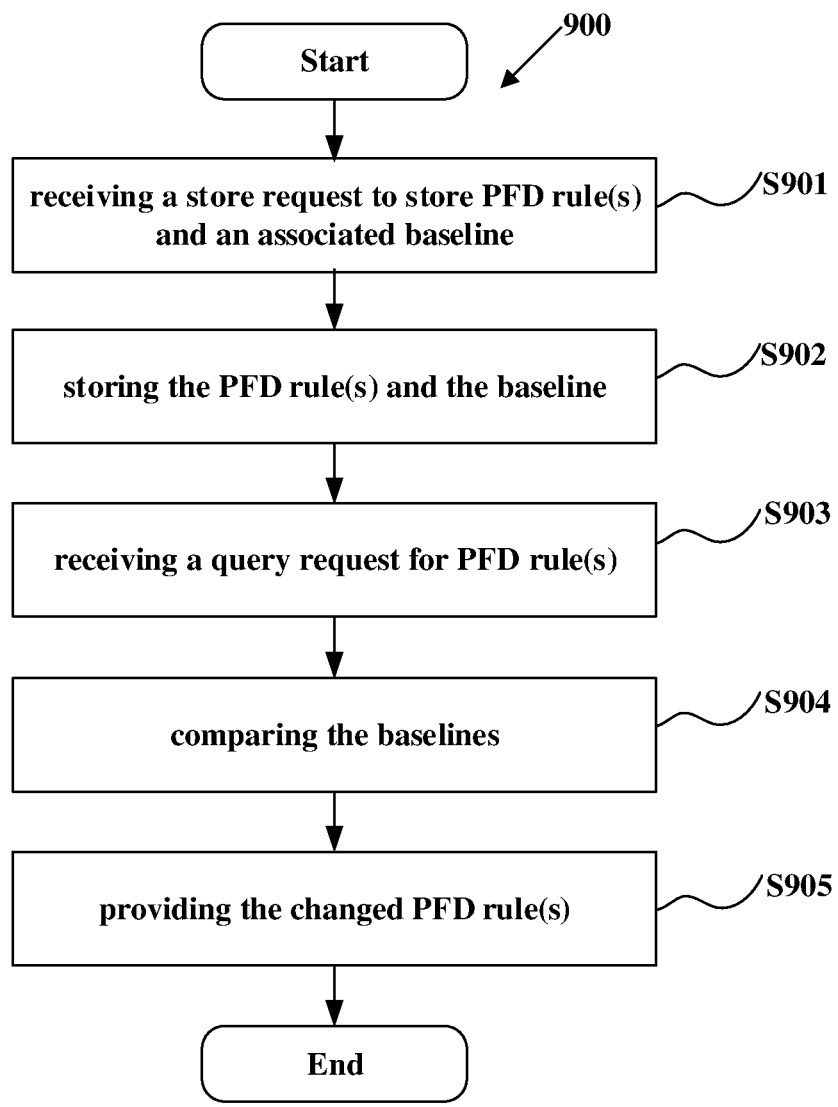
FIG. 9 is a schematic flow chart showing an example PFD management method in the UDR, according to the embodiments herein.

FIG. 9 is a schematic flow chart showing an example PFD management method in the UDR, according to the embodiments herein. In one embodiment, the flow chart in FIG. 9 can be implemented in the UDR in FIGS. 3-7C.

The method 900 may begin with step S901, in which the UDR 303 may receive a store request to store at least one PFD rule for an application and an associated baseline from the NEF 301. The baseline is a version reference or a time stamp. Then, at step S902, the UDR 303 may store the at least one PFD rule and the associated baseline.

The method 900 further includes S903, in which the UDR 303 may receive a query request with an associated baseline from the NEF 301. Then, in response to the query request from the NEF 301, at step S904, the UDR 303 may compare the baseline associated with the query request and the baseline stored in the UDR 303 for this application, and may determine whether there is new baseline (e.g., new version) for this application. In particular, if the query request indicates no baseline, then the UDR 303 may determine that the stored PFD rule(s) will be the new version. Then, at step S905, the UDR 303 may provide the changed PFD rule(s), if a new baseline is found. The UDR 303 may also provide the baseline (e.g. version number or time stamp).

Note that, the above steps S901-S902 and S903-S905 may be perform in any manner, for example, performed in any sequence, performed at the same time, or performed separately. Furthermore, these steps may be performed repeatedly. The above steps are only examples, and the UDR 303 may perform any actions described in connection to FIGS. 3-7C, to manage the PFD rule(s).

Figure 10:
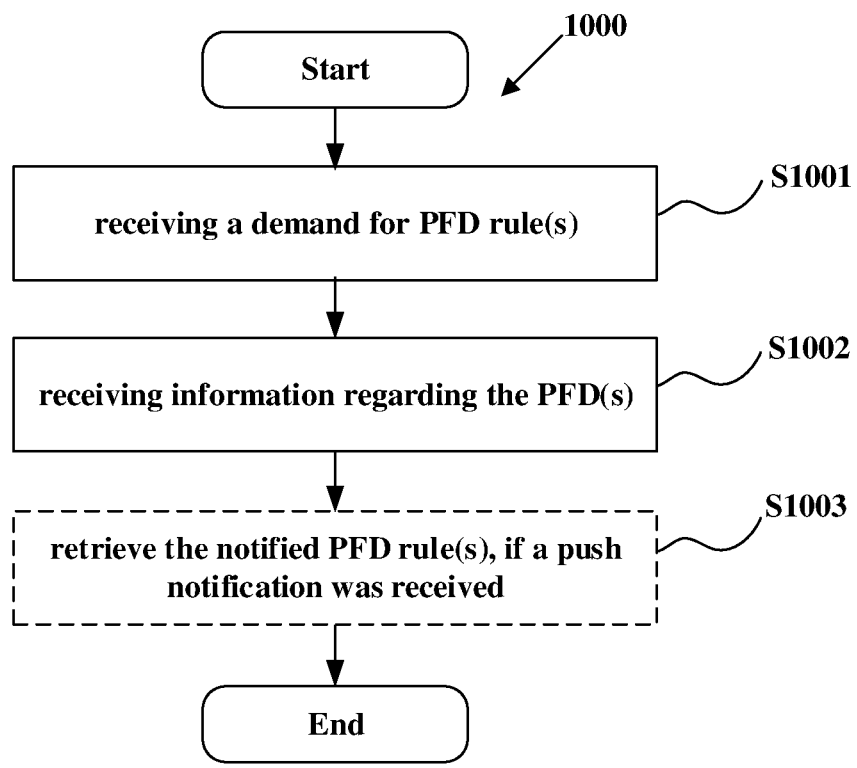
FIG. 10 is a schematic flow chart showing an example PFD management method in the UPF, according to the embodiments herein.

FIG. 10 is a schematic flow chart showing an example PFD management method in the UPF, according to the embodiments herein. In one embodiment, the flow chart in FIG. 10 can be implemented in the UPF in FIGS. 3-7C.

The method 1000 may begin with step S1001, in which the UPF 302 may transmit a demand message indicating the demand for at least one PFD rule for an application to the NEF 301.

In one embodiment, the demand message may indicate a subscription of the PFD management service. That is, as shown in FIGS. 4A-4B and FIG. 7A-7C, the UPF 302 may subscribe to NEF PFD management service, so that whenever the NEF 301 receive a new version of the PFD (new baseline) from the AF 304, the NEF 301 may notify the UPF 302 about the new version (push).

In one embodiment, the demand message (subscription in this embodiment) may include a baseline or no baseline. That is, if the UPF 302 has an older version (baseline) of the PFD for this application, the UPF 302 may indicate the baseline in the subscription; as a result the NEF 301 may only indicate the changed (added, deleted, or updated) PFD to the UPF 302. Otherwise, if the UPF 302 does not have any version (baseline) of the PFD for this application, the UPF 302 may indicate no baseline. The baseline may be a version number or a time stamp.

In one embodiment, the demand message (subscription in this embodiment) may include push notification demand, so that the NEF 301 may only transmit a push notification to the UPF 302 if any new version is received, then the UPF 302 may download the PFD rules in an available time. For example, the UPF 302 may retrieve the notified PFD rule during an Operation and Maintenance (O&M) maintenance window or at Packet Data Unit (PDU) session establishment, as shown in FIGS. 4A-4B and 7A-7C.

In one embodiment, the push notification demand may be applied only to the application not frequently used. For application frequently used, the NEF 301 may push the PFD rule(s), so that the UPF 302 may obtain the PFD rule(s) immediately.

In one embodiment, the demand message may indicate a request of the PFD management service, as shown in FIGS. 6A-6B and 7A-7C. That is, the UPF 302 may ask (request) the NEF 301 to provide the PFD for an application (pull).

In one embodiment, the demand message (PFD request in this embodiment) may include a baseline or no baseline, similar to the push scenario.

Then, the method 1000 may proceed to step S1002, in which the UPF 302 may receive information regarding the at least one PFD rule from the NEF 301.

In one embodiment, depending on the demand message from the UPF 302, the NEF 302 may either notify the existence of the changed PFD rule (partial PFD rule) and the latest baseline to the UPF 302, or transmit the changed PFD rule along with the notification.

Then, at step S1003, the UPF 302 may retrieve the notified PFD rule during an Operation and Maintenance (O&M) maintenance window or at Packet Data Unit (PDU) session establishment. Note that, this is step is not necessary for all of the application, since the NEF 302 may transmit the changed PFD rule along with the notification.

The above steps are only examples, and the UPF 302 may perform any actions described in connection to FIGS. 3-7C, to manage the PFD rule(s).

Figure 11:
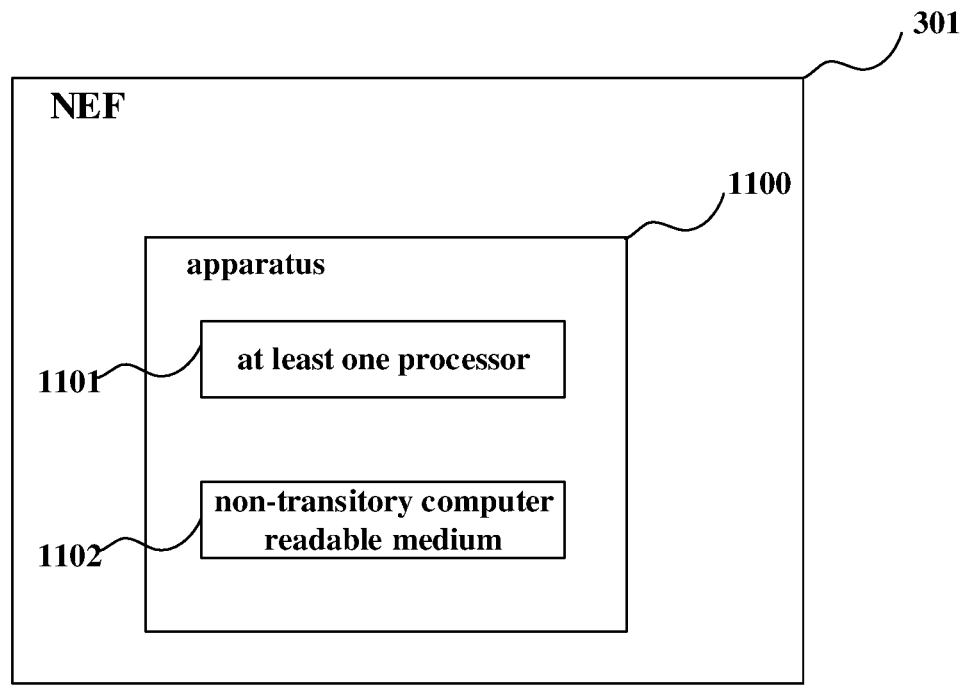
FIG. 11 is a schematic block diagram showing an example PFD management apparatus in the NEF, according to the embodiments herein.

FIG. 11 is a schematic block diagram showing an example PFD management apparatus in the NEF 301, according to the embodiments herein.

In one embodiment, the example PFD management apparatus in the NEF 301 may include at least one processor 1101; and a non-transitory computer readable medium 1102 coupled to the at least one processor 1101. The non-transitory computer readable medium 1102 contains instructions executable by the at least one processor 1101, whereby the at least one processor 1101 is configured to perform the steps in the example method 800 as shown in the schematic flow chart of FIG. 8; the details thereof is omitted here.

Note that, the example PFD management apparatus in the NEF 301 may be implemented as hardware, software, firmware and any combination thereof. For example, the example PFD management apparatus in the NEF 301 may include a plurality of units, circuities, modules or the like, each of which can be used to perform one or more step of the example method 800 or one or more step shown in FIG. 3-7C related to the NEF 301.

Figure 12:
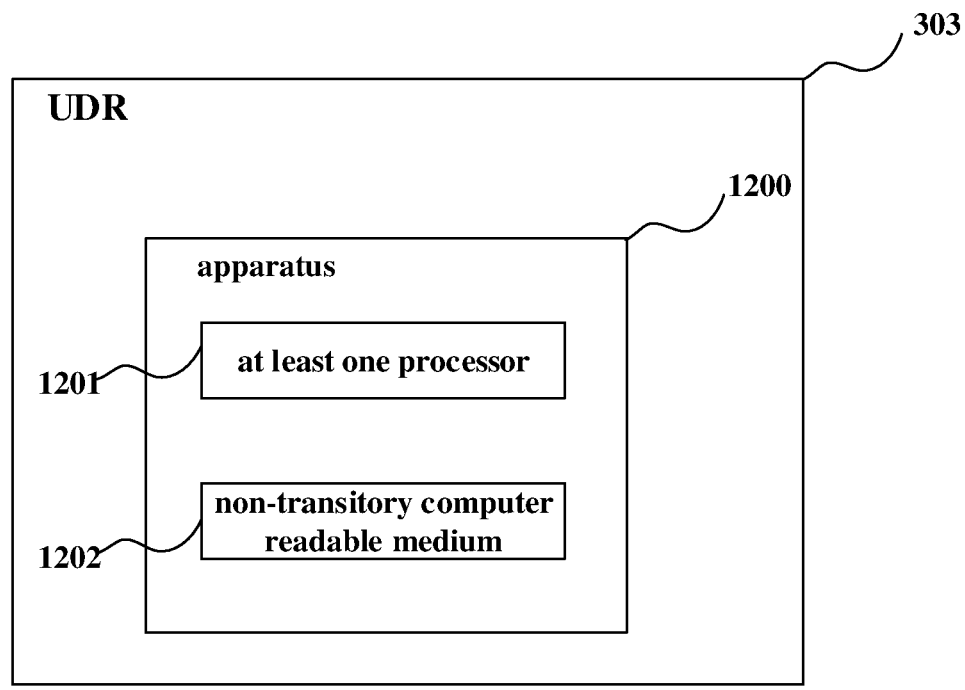
FIG. 12 is a schematic block diagram showing an example PFD management apparatus in the UDR, according to the embodiments herein.

FIG. 12 is a schematic block diagram showing an example PFD management apparatus in the UDR 303, according to the embodiments herein.

In one embodiment, the example PFD management apparatus in the UDR 303 may include at least one processor 1201; and a non-transitory computer readable medium 1202 coupled to the at least one processor 1201. The non-transitory computer readable medium 1202 contains instructions executable by the at least one processor 1201, whereby the at least one processor 1201 is configured to perform the steps in the example method 900 as shown in the schematic flow chart of FIG. 9; the details thereof is omitted here.

Note that, the example PFD management apparatus in the UDR 303 may be implemented as hardware, software, firmware and any combination thereof. For example, the example PFD management apparatus in the UDR 303 may include a plurality of units, circuities, modules or the like, each of which can be used to perform one or more step of the example method 900 or one or more step shown in FIG. 3-7C related to the UDR 303.

Figure 13:
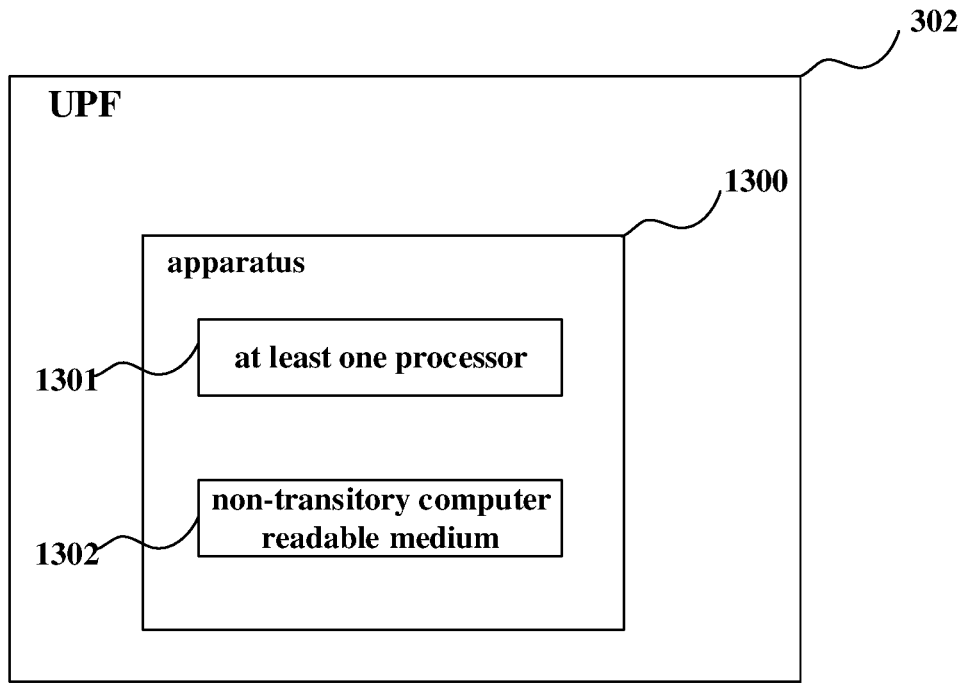
FIG. 13 is a schematic block diagram showing an example PFD management apparatus in the UPF, according to the embodiments herein.

FIG. 13 is a schematic block diagram showing an example PFD management apparatus in the UPF 302, according to the embodiments herein.

In one embodiment, the example PFD management apparatus in the UPF 302 may include at least one processor 1301; and a non-transitory computer readable medium 1302 coupled to the at least one processor 1301. The non-transitory computer readable medium 1302 contains instructions executable by the at least one processor 1301, whereby the at least one processor 1301 is configured to perform the steps in the example method 1000 as shown in the schematic flow chart of FIG. 10; the details thereof is omitted here.

Note that, the example PFD management apparatus in the UPF 302 may be implemented as hardware, software, firmware and any combination thereof. For example, the example PFD management apparatus in the UPF 302 may include a plurality of units, circuities, modules or the like, each of which can be used to perform one or more step of the example method 1000 or one or more step shown in FIG. 3-7C related to the UPF 302.

Figure 14:
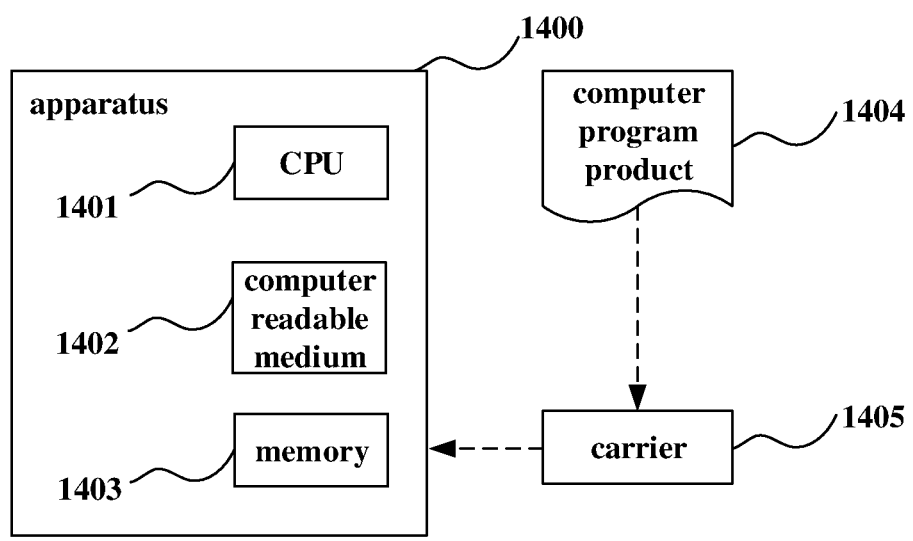
FIG. 14 is a schematic block diagram showing an example computer-implemented apparatus, according to the embodiments herein.

FIG. 14 is a schematic block diagram showing an example computer-implemented apparatus 1400, according to the embodiments herein. In one embodiment, the apparatus 1400 can be configured as the above mentioned apparatus, such as the example PFD management apparatus in the NEF 301, the example PFD management apparatus in the UPF 302, and the example PFD management apparatus in the UDR 303.

In one embodiment, the apparatus 1400 may include but not limited to at least one processor such as Central Processing Unit (CPU) 1401, a computer-readable medium 1402, and a memory 1403. The memory 1403 may comprise a volatile (e.g. Random Access Memory, RAM) and/or non-volatile memory (e.g. a hard disk or flash memory). In one embodiment, the computer-readable medium 1402 may be configured to store a computer program and/or instructions, which, when executed by the processor 1401, causes the processor 1401 to carry out any of the above mentioned methods.

In one embodiment, the computer-readable medium 1402 (such as non-transitory computer readable medium) may be stored in the memory 1403. In another embodiment, the computer program can be stored in a remote location for example computer program product 1404 (also can be embodied as computer-readable medium), and accessible by the processor 1401 via for example carrier 1405.

The computer-readable medium 1402 and/or the computer program product 1404 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described above with the 5G architecture, however, the embodiments are also similarly applicable to the 4G LTE (Evolved Packet Core, EPC) or other communication systems.

For example, in one embodiment, the AF and respective actions thereof may be SCS/AS and respective actions thereof, the NEF and respective actions thereof may be replaced with SCEF and respective actions thereof, the PFD Management service in NEF and respective actions thereof may be replaced with PFDF entity and respective actions thereof, the UPF and respective actions thereof may be replaced with TDF-U or PGW-U and respective actions thereof, the storage of PFDs in UDR and respective actions thereof may be replaced with storing at PFDF entity and respective actions thereof.

For example, the network exposure node are described above with the Network Exposure Function (NEF) 301 in the example embodiments, however the network exposure node may also be replaced with a Service Capability Exposure Function (SCEF).

For example, the user plane node are described above with the User Plane Function (UPF) 302 in the example embodiments, however the network exposure node may also be replaced with a Traffic Detection Function User plane function (TDF-U) or a PDN Gateway User plane function (PGW-U).

For example, the PFD storage node are described above with the Unified Data Repository (UDR) 303 in the example embodiments, however the network exposure node may also be replaced with a Packet Flow Description Function (PFDF) entity.

For example, the content providing node are described above with the Application Function (AF) 304 in the example embodiments, however the network exposure node may also be replaced with a Service Capability Server (SCS)/Application Server (AS).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

AF Application Function
AMF Access and Mobility Function
AS Application Server
CP Control Plane
CUPS Control Plane User Plane Separation
DL Downlink
DPI Deep Packet Inspection
FAR Forwarding Action Rule
IE Information Element
NEF Network Exposure Function
PCF Policy Control Function
PCRF Policy and Charging Rule Function
PDN Packet Data Network
PDR Packet Detection Rule
PDU Packet Data Unit
PFCP Packet Flow Control Protocol
PFDF Packet Flow Description Function
PFD Packet Flow Description
PGW Packet Gateway
PGW-U PDN Gateway User plane function
QoS Quality of Service
RAN Radio Access Network
SCEF Service Capability Exposure Function
SCS Service Capability Server
SDF Service Data Flow
SMF Session Management Function
SUPI Subscription Permanent Identifier
TDF-U Traffic Detection Function User plane function
UDR Unified Data Repository
UE User Equipment
UL Uplink
UP User Plane
UPF User Plane Function
URR Usage Reporting Rule
WID Work Item Identifier.

What is claimed is:

1. A method performed at a network exposure node for managing Packet Flow Description (PFD), the method comprising:
receiving one or more PFD rules for an application from a content providing node through a northbound API for PFD management of the network exposure node;
associating a baseline with the one or more PFD rules for the application;
receiving from a network node a demand message indicating a request for at least one PFD rule for an application, the demand message including a baseline;
detecting at least one updated PFD rule based on the baseline associated with the one or more PFD rules received from the content providing node and the baseline received in the demand message from the network node; and
notifying the at least one updated PFD rule to the network node;
wherein the notifying the at least one updated PFD rule to the network node further comprises:
notifying the one or more updated PFD rules and the latest baseline; or
transmitting the one or more updated PFD rules along with the latest baseline;
wherein the baselines are a version reference or a time stamp.

2. The method of claim 1, further comprising:
requesting a PFD storage node to store the one or more PFD rules for the application and the associated baseline.

3. The method of claim 2, wherein the detecting the at least one PFD rule further comprises:
querying the PFD storage node for the at least one PFD rule based on the baseline received in the demand message from the network node;
receiving the updated PFD rule from the PFD storage node.

4. The method of claim 1, wherein the method is performed at a Network Exposure Function (NEF) or a Service Capability Exposure Function (SCEF);
wherein the network node is a Session Management Function (SMF), a User Plane Function (UPF), a Traffic Detection Function User plane function (TDF-U), or a PDN Gateway User plane function (PGW-U); and
wherein the content providing node is an Application Function (AF) or a Service Capability Server (SCS)/Application Server (AS).

5. A method performed at a network node for managing Packet Flow Description (PFD) comprising:
transmitting a demand message indicating a request for at least one PFD rule for an application to a network exposure node, the demand message including a baseline;
receiving at least one updated PFD rule from the network exposure node based on the baseline;
wherein the receiving information regarding the at least one updated PFD rule from the network exposure node further comprises:
receiving the latest baseline and one or more updated PFD rules relative to the PFD rule and the baseline in the demand message; or
receiving the one or more updated PFD rules; wherein the baselines are a version reference or a time stamp.

6. The method of claim 5, wherein the method is performed at a Session Management Function (SMF), a User Plane Function (UPF), a Traffic Detection Function User plane function (TDF-U), or a PDN Gateway User plane function (PGW-U); and
wherein the network exposure node is a Network Exposure Function (NEF) or a Service Capability Exposure Function (SCEF).

7. A method performed at a PFD storage node for managing Packet Flow Description (PFD) comprising:
receiving a store request to store at least one PFD rule for an application and an associated baseline;
storing the at least one PFD rule and the associated baseline;

receiving a query request with an associated baseline;
comparing the baseline associated with the query request and the stored baseline; and
providing one or more updated PFD rules based on the baseline associated with the query request and the stored baseline;
wherein the baselines are a version reference or a time stamp.

8. The method of claim 7, wherein the method is performed at a Unified Data Repository (UDR) or a Packet Flow Description Function (PFDF) entity.

9. An apparatus for managing Packet Flow Description (PFD) comprising:
at least one processor; and
a non-transitory computer readable medium coupled to the at least one processor, the non-transitory computer readable medium contains instructions executable by the at least one processor, whereby the at least one processor is configured to:
receive one or more PFD rules for one or more applications from a content providing node through a northbound API for PFD management of the network exposure node;
associate a baseline with the one or more PFD rules for the application;
receive from a network node a demand message indicating the request for at least one PFD rule for an application, the demand message including a baseline;
detect at least one updated PFD rule based on the baseline associated with the one or more PFD rules received from the content providing node and the baseline received in the demand message from the network node; and
notify the at least one updated PFD rule to the network node;
wherein notify the at least one updated PFD rule to the network node, the at least one processor is further configured to:
notify the one or more updated PFD rules and the latest baseline; or
transmit the one or more updated PFD rules along with the latest baseline wherein the baselines are a version reference or a time stamp.

10. The apparatus of claim 9, wherein the at least one processor is further configured to:
request a PFD storage node to store the one or more PFD rules for the application and the associated baseline.

11. The apparatus of claim 9, when detecting the at least one PFD rule, the at least one processor is further configured to:
query the PFD storage node for the at least one PFD rule based on the baseline received in the demand message from the network node;
receive the one or more updated PFD rules from the PFD storage node.

12. The apparatus of claim 9, wherein the apparatus is implemented in a Network Exposure Function (NEF) or a Service Capability Exposure Function (SCEF);
wherein the network node is a Session Management Function (SMF), a User Plane Function (UPF), a Traffic Detection Function User plane function (TDF-U), or a PDN Gateway User plane function (PGW-U);
and
wherein the content providing node is an Application Function (AF) or a Service Capability Server (SCS)/Application Server (AS).

13. An apparatus for managing Packet Flow Description (PFD) comprising:
at least one processor; and
a non-transitory computer readable medium coupled to the at least one processor, the non-transitory computer readable medium contains instructions executable by the at least one processor, whereby the at least one processor is configured to:
transmit a demand message indicating the request for at least one PFD rule for an application to a network exposure node, the demand message including a baseline;
receive at least one updated PFD rule from the network exposure node based on the baseline;
wherein receive information regarding the at least one updated PFD rule from the network exposure node, the at least one processor is further configured to:
receive the latest baseline and the one or more updated PFD rules relative to the PFD rule and the baseline in the demand message; or
receive the one or more updated PFD rules; wherein the baselines are a version reference or a time stamp.

14. The apparatus of claim 13, wherein the apparatus is implemented in a Session Management Function (SMF), a User Plane Function (UPF), a Traffic Detection Function User plane function (TDF-U), or a PDN Gateway User plane function (PGW-U); and
wherein the network exposure node is a Network Exposure Function (NEF) or a Service Capability Exposure Function (SCEF).

15. An apparatus for managing Packet Flow Description (PFD) comprising:
at least one processor; and
a non-transitory computer readable medium coupled to the at least one processor, the non-transitory computer readable medium contains instructions executable by the at least one processor, whereby the at least one processor is configured to:
receive a store request to store at least one PFD rule for an application and an associated baseline;
store the at least one PFD rule and the associated baseline;
receive a query request with an associated baseline;
compare the baseline associated with the query request and the stored baseline; and
provide one or more updated PFD rules based on the baseline associated with the query request and the stored baseline;
wherein the baselines are a version reference or a time stamp.

16. The apparatus of claim 15, wherein the apparatus is implemented in a Unified Data Repository (UDR) or a Packet Flow Description Function (PFDF) entity.

* * * * *